United States Patent
Han et al.

(10) Patent No.: US 12,292,949 B2
(45) Date of Patent: May 6, 2025

(54) METHOD FOR DETERMINING USER AUTHENTICATION SCHEME OF ELECTRONIC DEVICE, AND ELECTRONIC DEVICE THEREFOR

(71) Applicant: Samsung Electronics Co., Ltd., Suwon-si (KR)

(72) Inventors: Jonghyun Han, Suwon-si (KR); Youngil Oh, Suwon-si (KR); Sunyoung Park, Suwon-si (KR); Younghak Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 168 days.

(21) Appl. No.: 17/951,663

(22) Filed: Sep. 23, 2022

(65) Prior Publication Data

US 2023/0026952 A1     Jan. 26, 2023

Related U.S. Application Data

(63) Continuation of application No. PCT/KR2021/001138, filed on Jan. 28, 2021.

(30) Foreign Application Priority Data

Mar. 26, 2020    (KR) .................. 10-2020-0037034

(51) Int. Cl.
*G06F 21/00*    (2013.01)
*G06F 21/31*    (2013.01)

(52) U.S. Cl.
CPC ................... *G06F 21/31* (2013.01)

(58) Field of Classification Search
CPC ........ G06F 21/31; H04L 63/08; H04W 12/06; H04W 12/062; H04W 12/065
See application file for complete search history.

(56) References Cited

U.S. PATENT DOCUMENTS 8,019,131 B2    9/2011  Wong et al.
9,916,431 B2    3/2018  Hwang et al.
(Continued)

FOREIGN PATENT DOCUMENTS

CN    107209653 A       9/2017
CN    110413181 A  *  11/2019   .......... G06F 3/0488
(Continued)

OTHER PUBLICATIONS

Korean Office Action dated Jul. 15, 2024, issued in Korean Application No. 10-2020-0037034.
(Continued)

*Primary Examiner* — Joseph P Hirl
*Assistant Examiner* — Chi D Nguy
(74) *Attorney, Agent, or Firm* — Jefferson IP Law, LLP

(57) ABSTRACT

An electronic device is provided. The electronic device includes a first housing, a second housing foldable with respect to the first housing around a first folding axis, a third housing foldable with respect to the second housing around a second folding axis, a first sensor configured to detect a first folding state with respect to the first housing and the second housing, a second sensor configured to detect a second folding state with respect to the second housing and the third housing, at least one input device configured to acquire authentication information for performing user authentication according to a plurality of user authentication schemes, and at least one processor connected to the first sensor, the second sensor, and the at least one input device, wherein the at least one processor determines a user authentication scheme from among the plurality of user authentication schemes based on a folding state of the electronic device according to the first folding state and the second folding state, and controls, among the at least one input device, an input device corresponding to the determined user (Continued)

authentication scheme so as to acquire the authentication information.

18 Claims, 24 Drawing Sheets

(56) References Cited

U.S. PATENT DOCUMENTS

| | | |
|---|---|---|
| 10,120,458 B2 | 11/2018 | Kwak et al. |
| 10,353,659 B2 | 7/2019 | Han et al. |
| 10,485,056 B2 | 11/2019 | Schantz et al. |
| 2010/0064244 A1 | 3/2010 | Kilpatrick et al. |
| 2016/0026219 A1 | 1/2016 | Kim et al. |
| 2016/0085325 A1 | 3/2016 | Lee et al. |
| 2019/0103115 A1* | 4/2019 | Lesso ............... G10L 25/51 |
| 2020/0209917 A1 | 7/2020 | Zhou et al. |
| 2022/0005340 A1 | 1/2022 | Han et al. |
| 2022/0335406 A1* | 10/2022 | Xu ............... G06Q 20/3223 |

FOREIGN PATENT DOCUMENTS

| | | | |
|---|---|---|---|
| CN | 107480489 B | 12/2019 | |
| JP | 2010-066921 A | 3/2010 | |
| JP | 4543560 B2 * | 9/2010 | ............ H04N 1/036 |
| KR | 10-2014-0024145 A | 2/2014 | |
| KR | 10-2015-0060278 A | 6/2015 | |
| KR | 10-2016-0013748 A | 2/2016 | |
| KR | 10-2016-0034660 A | 3/2016 | |
| KR | 10-2017-0103268 A | 9/2017 | |
| KR | 10-2020-0052679 A | 5/2020 | |

OTHER PUBLICATIONS

Notice of Patent Grant dated Dec. 6, 2024, issued in Korean Application No. 10-2020-0037034.

* cited by examiner

←----→ DISPLAY ACTIVE REGION

←- - - -→ AUTHENTICATION INFORMATION ACQUISITION REGION

510

610
OPERATION OF CONFIRMING AT LEAST ONE CANDIDATE AUTHENTICATION SCHEME THAT IS SET TO BE USABLE ACCORDING TO SITUATION IN WHICH IT IS NECESSARY TO ACQUIRE AUTHENTICATION INFORMATION FROM AMONG PLURALITY OF USER AUTHENTICATION SCHEMES

↓

620
OPERATION OF DETERMINING USER AUTHENTICATION SCHEME FROM AMONG PLURALITY OF USER AUTHENTICATION SCHEMES ON BASIS OF FOLDING STATE, WHEN AT LEAST ONE CANDIDATE AUTHENTICATION SCHEME IS PLURAL

FIG.6

METHOD FOR DETERMINING USER AUTHENTICATION SCHEME OF ELECTRONIC DEVICE, AND ELECTRONIC DEVICE THEREFOR

CROSS-REFERENCE TO RELATED APPLICATION(S)

This application is a continuation application, claiming priority under § 365(c), of an International application No. PCT/KR2021/001138, filed on Jan. 28, 2021, which is based on and claims the benefit of a Korean patent application number 10-2020-0037034, filed on Mar. 26, 2020, in the Korean Intellectual Property Office, the disclosure of which is incorporated by reference herein in its entirety.

BACKGROUND

1. Field

The disclosure relates to a method for determining a user authentication scheme of an electronic device, based on a folding state of the electronic device, and the electronic device therefor.

2. Description of Related Art

Portable electronic devices, such as smart phones or tablet personal computers (PCs), or the like, are becoming lighter and thinner for portability, and are developing in various ways for convenience of use. For example, a foldable electronic device having a flexible display provides a relatively larger screen than a general bar-type electronic device and, when the electronic device is folded, the electronic device can be reduced in its size and be improved in its portability, so the electronic device is being spotlighted as an electronic device for satisfying consumer's preferences.

The foldable electronic device can be implemented in the form of an organic light emitting display device or a liquid crystal display device. For example, a manufacturer can manufacture the foldable electronic device by using flexible materials, such as a plastic film for an organic substrate.

The above information is presented as background information only to assist with an understanding of the disclosure. No determination has been made, and no assertion is made, as to whether any of the above might be applicable as prior art with regard to the disclosure.

SUMMARY

Various situations requiring security can occur while an electronic device is used. For example, user authentication can be required when unlocking is intended in a standby screen of the electronic device, and user authentication can be required when security is required while an application is used. In this case, the electronic device may determine one of a plurality of user authentication schemes installed in the electronic device and acquire authentication information.

Meanwhile, unlike an electronic device of the related art, a foldable electronic device can have a plurality of folding states according to the folding of a hinge, and an activated region of a flexible display can be different according to each folding state. For example, in the foldable electronic device, the activation or non-activation of an input device (e.g., a fingerprint recognition sensor or an iris recognition sensor) for acquiring authentication information can be different according to the folding state, so, when the input device is inactivated, there is a need to determine a user authentication scheme based on the folding state in order to prevent a user inconvenience.

Aspects of the are to address at least the above-mentioned problems and/or disadvantages and to provide at least the advantages described below. Accordingly, an aspect of the disclosure is to provide an electronic device for determining a user authentication scheme from among a plurality of authentication schemes, based on information on a folding state of the electronic device and/or a use state of the electronic device, and controlling an input device corresponding to this to acquire authentication information.

Additional aspects will be set forth in part in the description which follows and, in part, will be apparent from the description, or may be learned by practice of the presented embodiments.

In accordance with an aspect of the disclosure, an electronic device is provided. The electronic device includes a first housing, a second housing foldable around a first folding axis with respect to the first housing, a third housing foldable around a second folding axis with respect to the second housing, a first folding detection sensor configured to detect a first folding state with respect to the first housing and the second housing, a second folding detection sensor configured to detect a second folding state with respect to the second housing and the third housing, at least one input device configured to acquire authentication information for performing user authentication that is based on a plurality of user authentication schemes, and at least one processor connected to the first folding detection sensor, the second folding detection sensor, and the at least one input device. The at least one processor may determine a user authentication scheme from among the plurality of user authentication schemes, based on a folding state of the electronic device according to the first folding state and the second folding state, and control an input device corresponding to the determined user authentication scheme from among the at least one input device to acquire the authentication information.

In accordance with another aspect of the disclosure, a method for determining a user authentication scheme of an electronic device is provided. The method includes determining a user authentication scheme from among a plurality of user authentication schemes, based on a folding state of the electronic device according to a first folding state with respect to a first housing of the electronic device and a second housing of the electronic device and a second folding state with respect to the second housing and a third housing of the electronic device, and controlling an input device corresponding to the determined user authentication scheme among at least one input device for acquiring authentication information for performing user authentication that is based on a plurality of user authentication schemes of the electronic device, to acquire the authentication information.

According to various embodiments disclosed in the disclosure, an electronic device may determine a user authentication scheme suitable for each folding state and may present a user convenience, by determining the user authentication scheme from among a plurality of authentication schemes, based on a folding state of the electronic device and/or an activation state of a display according to the folding state.

According to various embodiments disclosed in the disclosure, an electronic device may promote an optimal user convenience by additionally considering information on a use state of the electronic device when determining a user authentication scheme, and may secure a security of user authentication by comparing a security level set for the electronic device and a security level of a determined user authentication scheme.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a flowchart illustrating a method for determining a user authentication scheme of an electronic device according to an embodiment of the disclosure;

Throughout the drawings, it should be noted that like reference numerals are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
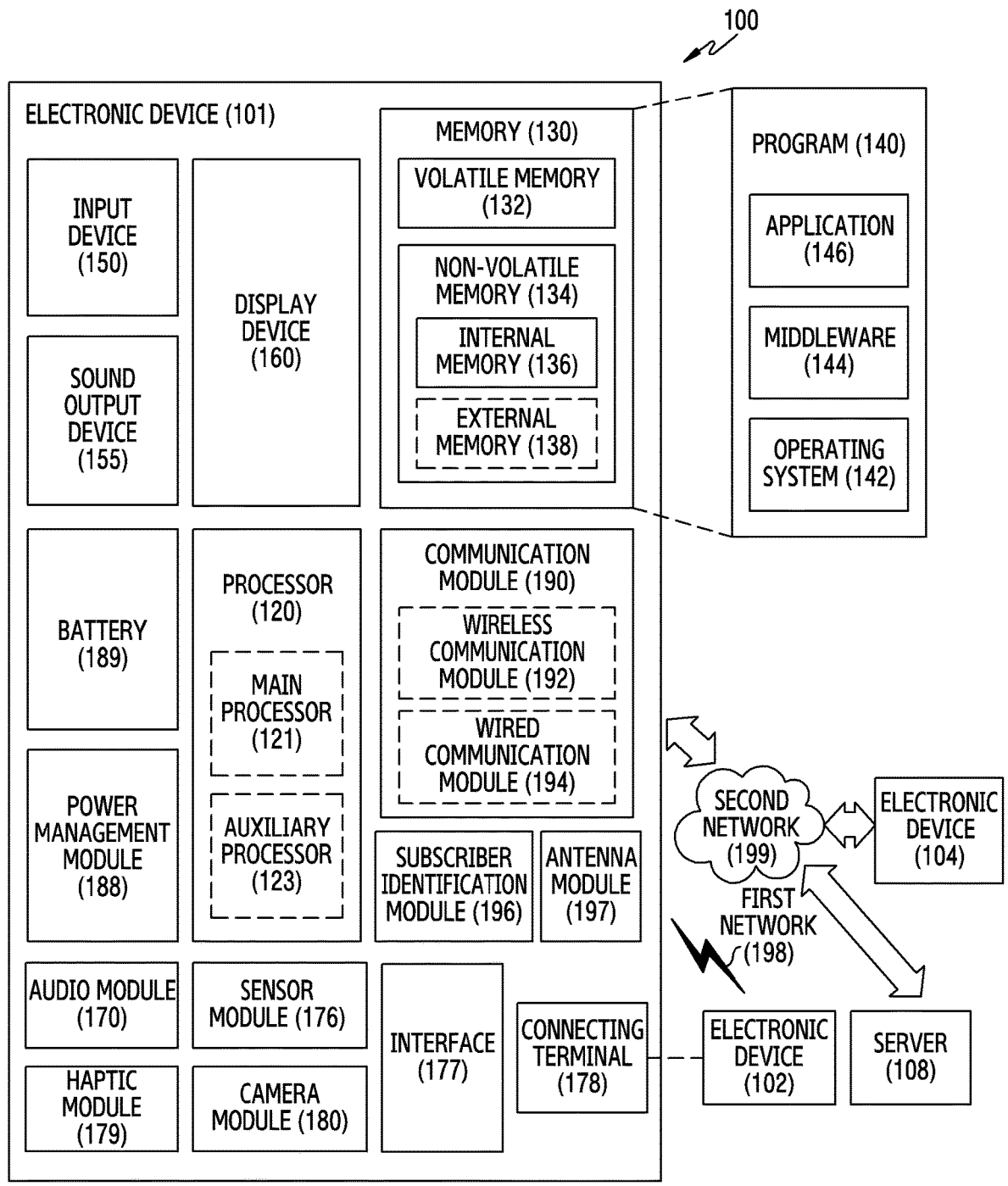
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure of the disclosure, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a PCB). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
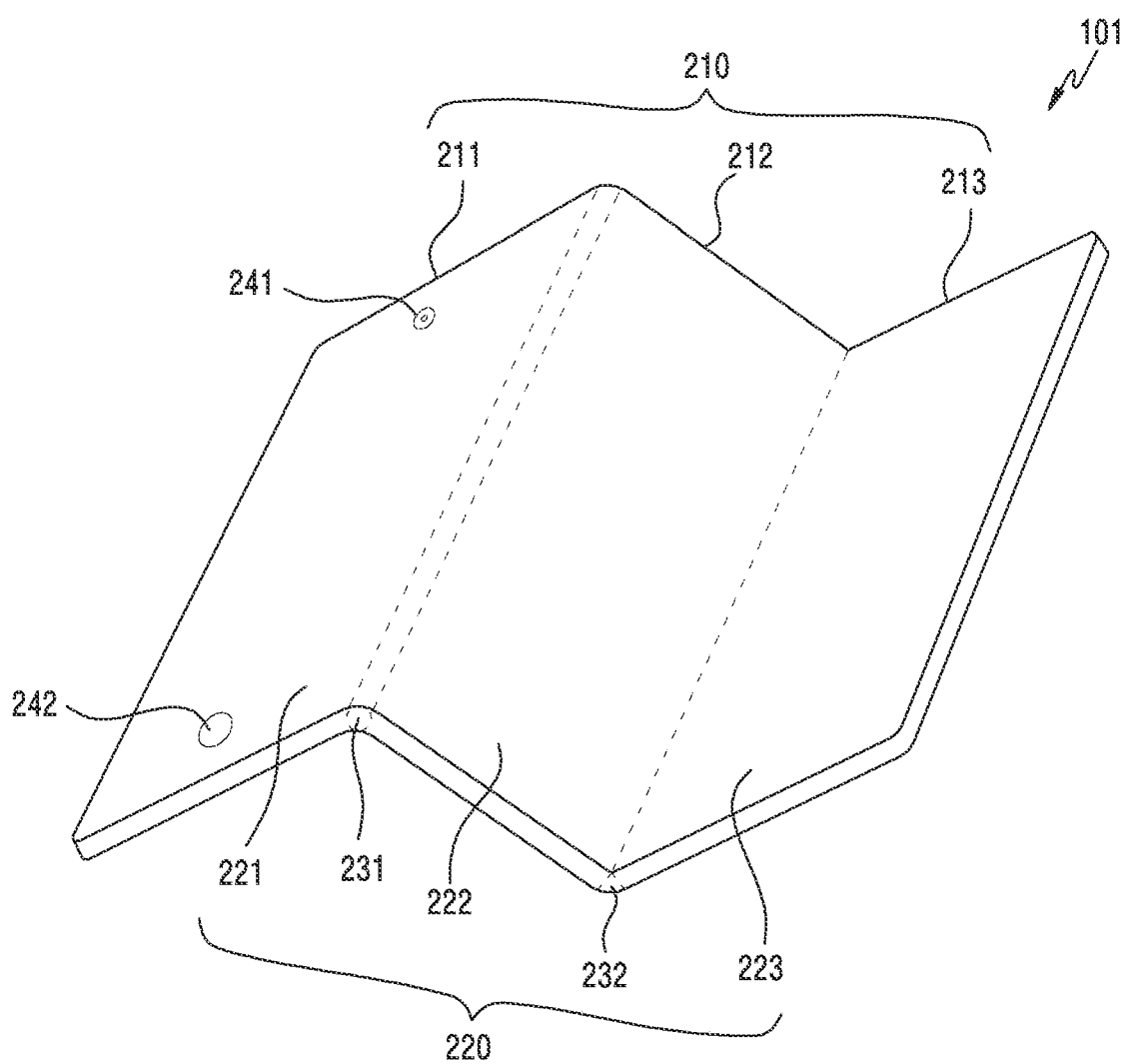
FIG. 2 is a diagram illustrating an electronic device according to an embodiment of the disclosure.

FIG. 2 is a diagram illustrating an electronic device according to an embodiment of the disclosure.

Referring to FIG. 2, the electronic device 101 of an embodiment of the disclosure may include a foldable housing 210 (or "housing"), a flexible display 220 (or "display"), a first hinge assembly 231, a second hinge assembly 232, a camera 241, and a fingerprint input device 242. In an embodiment of the disclosure, the foldable housing 210 may include a first housing 211, a second housing 212, and a third housing 213. In an embodiment of the disclosure, the flexible display 220 may include a first display region 221, a second display region 222, and a third display region 223.

According to an embodiment of the disclosure, the first housing 211, the second housing 212, and the third housing 213 may form a space in which electronic components (e.g., a printed circuit board, a battery, and a processor) of the electronic device 101 may be arranged, and may also form a side surface of the electronic device 101. In an example, various types of components for performing various functions of the electronic device 101 may be arranged inside the first housing 211, the second housing 212, and the third housing 213. For example, electronic components, such as a camera (e.g., the camera module 180 of FIG. 1), a receiver (e.g., the sound output device 155 of FIG. 1), a sensor (e.g., the sensor module 176 of FIG. 1 and/or an inertial sensor), and a processor (e.g., the processor 120 of FIG. 1) may be arranged inside the first housing 211, the second housing 212, and the third housing 213. Although not shown in the drawing, the above-described electronic components may be exposed on a front surface of the electronic device 101 through at least one opening or recess provided on the flexible display 220. In various embodiments of the disclosure, for convenience of description, a surface on which the flexible display 220 is arranged may be defined as a front surface, and an opposite surface may be defined as a rear surface.

According to an embodiment of the disclosure, the first housing 211, the second housing 212, and the third housing 213 may be arranged side by side on the same surface, when the electronic device 101 is in a fully unfolded state. According to an embodiment of the disclosure, when the electronic device 101 is in a fully folded state, one surface of the first housing 211 and one surface of the second housing 212 may be arranged to face each other, and the other surface of the second housing 212 and one surface of the third housing 213 may be arranged to face each other. According to an embodiment of the disclosure, when the electronic device 101 is in a so-called intermediate state, not the fully unfolded state or the fully folded state, the first housing 211 and the second housing 212 may be arranged to form a certain angle and/or the second housing 212 and the third housing 213 may be arranged to form a certain angle.

According to an embodiment of the disclosure, the first housing 211 or the second housing 212 may be folded or unfolded by rotatably moving (or rotating) about the first hinge assembly 231 with respect to a first folding axis, and the second housing 212 or the third housing 213 may be folded or unfolded by rotatably moving (or rotating) about the second hinge assembly 232 with respect to a second folding axis. According to an embodiment of the disclosure, an arrangement state of the first housing 211 and the second housing 212 and/or an arrangement state of the second housing 212 and the third housing 213 may be detected by a folding sensor.

According to an embodiment of the disclosure, the first housing 211, the second housing 212, and the third housing 213 may form a recess for accommodating the flexible display 220, and the flexible display 220 may be seated in the recess and be supported by the first housing 211, the second housing 212, and the third housing 213. According to another embodiment of the disclosure, the flexible display 220 may be supported by a support plate (not shown) located between the flexible display 220 and the foldable housing 210. According to an embodiment of the disclosure, the first housing 211, the second housing 212, and the third housing 213 may be formed of a metal material and/or a non-metal material having a specified rigidity in order to support the flexible display 220.

According to an embodiment of the disclosure, the flexible display 220 may be arranged on the first housing 211, the second housing 212, and the third housing 213, and when the electronic device 101 is in a fully unfolded state, the flexible display 220 may form a front surface of the electronic device 101. The flexible display 220 may be arranged to extend from one region of the first housing 211 to at least one region of the second housing 212 across the first hinge assembly 231, and may be arranged to extend from one region of the second housing 212 to at least one region of the third housing 213 across the second hinge assembly 232. According to an embodiment of the disclosure, the flexible display 220 may be seated in the recess formed by the first housing 211, the second housing 212, and/or the third housing 213 and be arranged on the first housing 211, the second housing 212 and/or the third housing 213.

According to an embodiment of the disclosure, the flexible display 220 may include the first display region 221 corresponding to at least one region of the first housing 211, the second display region 222 corresponding to at least one region of the second housing 212, and the third display region 223 corresponding to at least one region of the third housing 213. The flexible display 220 may further include a first folding region (not shown) located between the first display region 221 and the second display region 222 and having a flexibility characteristic, and a second folding region (not shown) located between the second display region 222 and the third display region 223 and having a flexibility characteristic. According to an embodiment of the disclosure, the first folding region and the second folding region may be omitted. For example, a part of the first folding region may be included in the first display region 221, and another part of the first folding region may be included in the second display region 222. In addition, a part of the second folding region may be included in the second display region 222, and another part of the second folding region may be included in the third display region 223.

However, the disclosure is not limited to the above-described embodiment, and according to an embodiment of the disclosure, the first display region 221, the second display region 222, and the third display region 223 of the flexible display 220 may all have a flexibility characteristic similarly to the folding region. According to an embodiment of the disclosure, when the electronic device 101 is in a fully unfolded state, the first display region 221, the second display region 222, the third display region 223, the first folding region, and the second folding region may face in the same direction and be arranged side by side. Unlike this, when the electronic device 101 is in a fully folded state, the first folding region may be bent and the first display region 221 and the second display region 222 may be arranged to put rear surfaces in contact with each other and face in opposite directions, and the second folding region may be bent and the second display region 222 and the third display region 223 may be arranged to face each other.

According to an embodiment of the disclosure, at least one region (e.g., the first display region 221) of the flexible display 220 may be attached to one surface of the first housing 211, and another region (e.g., the second display region 222) may be attached to one surface of the second housing 212, and a further another region (e.g., the third display region 223) may be attached to one surface of the third housing 213. According to another embodiment of the disclosure, the flexible display 220 may be attached to the one surface of the first housing 211, the one surface of the second housing 212, and the one surface of the third housing 213 through a support plate located between the flexible display 220 and the foldable housing 210 as well.

According to an embodiment of the disclosure, the support plate may include a first support plate attached to at least one region of the first housing 211 and supporting the first display region 221 of the flexible display 220, a second support plate attached to at least one region of the second housing 212 and supporting the second display region 222 of the flexible display 220, and a third support plate attached to at least one region of the third housing 213 and supporting the third display region 223 of the flexible display 220. The first support plate may be attached to at least a portion of the first display region 221 of the flexible display 220 and support the flexible display 220. Similarly, the second support plate may be attached to at least a portion of the second display region 222 of the flexible display 220 and support the flexible display 220, and the third support plate may be attached to at least a portion of the third display region 223 of the flexible display 220 and support the flexible display 220. The first support plate, the second support plate, and/or the third support plate may be formed of a material having a rigidity in order to support the flexible display 220.

According to an embodiment of the disclosure, the first hinge assembly 231 may connect the first housing 211 and the second housing 212, and the second hinge assembly 232 may connect the second housing 212 and the third housing 213. The first housing 211 or the second housing 212 may rotate about the first hinge assembly 231 within a rotation range specified with respect to the second housing 212 or the first housing 211, respectively. The second housing 212 or the third housing 213 may rotate about the second hinge assembly 232 within a rotation range specified with respect to the third housing 213 or the second housing 212, respectively.

The disclosure has been described based on an example in which the first hinge assembly 231 and the second hinge assembly 232 rotate in opposite directions within a specified rotation range (e.g., 180 degrees), but the rotation range is not limited thereto. For example, the first hinge assembly 231 and the second hinge assembly 232 may rotate in the same direction within a specified rotation range, and the first folding region may be bent and the first display region 221 and the second display region 222 may be rotatably moved to face each other, and the second folding region may be bent and the second display region 222 and the third display region 223 may be rotatably moved to put rear surfaces in contact with each other and face in opposite directions, and the first hinge assembly 231 and the second hinge assembly 232 may all be rotatable at 360 degrees without a limitation of the rotation range as well.

According to an embodiment of the disclosure, the first hinge assembly 231 and the second hinge assembly 232 may each include a hinge housing (not shown), and the hinge housing may be coupled to the foldable housing 210. The hinge housing may be exposed to the outside of the electronic device 101 or be hidden by the foldable housing 210 according to a state of the electronic device 101. In an example, when the electronic device 101 is in a fully unfolded state, the hinge housing may be hidden by the foldable housing 210 and be invisible to the outside of the electronic device 101. In another example, when the electronic device 101 is in a fully folded state, the hinge housing may be viewed from the outside of the electronic device 101, and when the electronic device 101 is not in the fully unfolded state or the fully folded state, the hinge housing may be partially exposed to the outside between the first housing 211 and the second housing 212 or between the second housing 212 and the third housing 213. In this case, a region where the hinge housing is exposed to the outside of the electronic device 101 may be smaller than a region exposed when the electronic device 101 is in the fully folded state.

According to the above-described construction, a front surface of the electronic device 101 may include the flexible display 220, a support plate for supporting the flexible display 220 at an edge of the flexible display 220, a partial region of the first housing 211 adjacent to the flexible display 220, a partial region of the second housing 212 adjacent to the flexible display 220, and a partial region of the third housing 213 adjacent to the flexible display 220.

According to an embodiment of the disclosure, the camera 241 may be arranged in a front surface of the electronic device 101 and capture an external image, and may be arranged above the flexible display 220 in the front surface of the electronic device 101. According to an embodiment of the disclosure, the fingerprint input device 242 may be arranged in the front surface of the electronic device 101 and acquire detection information for fingerprint recognition, and may be arranged below the flexible display 220 in the front surface of the electronic device 101 or be arranged within the flexible display 220.

In the disclosure, it is assumed that the camera 241 is arranged near an upper edge of a front surface of the first housing 211, and the fingerprint input device 242 is arranged near a lower edge of the front surface of the first housing 211. However, the disclosure is not limited thereto, and the camera 241 and the fingerprint input device 242 may be arranged near left and right edges of the front surface of the first housing 211 or may be arranged in the front surface of the third housing 213, or a plurality of cameras 241 and fingerprint input devices 242 may be arranged in various positions in the front surface of the foldable housing 210.

FIGS. 3A, 3B, 3C, 3D, 3E, 3F, 3G, 3H, and 3I illustrate a folding state of the electronic device according to an embodiment of the disclosure.

Referring to FIGS. 3A, 3B, 3C, 3D, 3E, 3F, 3G, 3H, and 3I, below, a first folding state based on an angle between the first housing 211 and the second housing 212, a second folding state based on an angle between the second housing 212 and the third housing 213, and a folding state of the electronic device 101 based on the first folding state and the second folding state will be described below.

In various embodiments of the disclosure, a folding state, an unfolding state, and an intermediate state may be defined by the angle between the first housing 211 and the second housing 212 or the angle between the second housing 212 and the third housing 213.

According to an embodiment of the disclosure, when the first folding state or the second folding state is an unfolded state, the first housing 211 and the second housing 212 or the second housing 212 and the third housing 213 may be arranged to form an angle of substantially 180 degrees and face in the same direction. According to an embodiment of the disclosure, a surface of the first display region 221 of the flexible display 220 and a surface of the second display region 222 of the flexible display 220, or the surface of the second display region 222 of the flexible display 220 and a surface of the third display region 223 of the flexible display 220 may form 180 degrees with each other and face in the same direction. According to an embodiment of the disclosure, in the unfolded state, the surface of the first display region 221 and the surface of the second display region 222, or the surface of the second display region 222 and the surface of the third display region 223 may be arranged to form an angle (e.g., 170 degrees) close to 180 degrees even if not exactly forming 180 degrees.

According to an embodiment of the disclosure, when the first folding state or the second folding state is the intermediate state, the first housing 211 and the second housing 212, or the second housing 212 and the third housing 213 may be arranged to form a certain angle with each other. According to an embodiment of the disclosure, the surface of the first display region 221 of the flexible display 220 and the surface of the second display region 222 of the flexible display 220, or the surface of the second display region 222 of the flexible display 220 and the surface of the third display region 223 of the flexible display 220 may form an angle greater than 0 degree and less than 180 degrees, or may form an angle (e.g., 10 degrees or more and 170 degrees or less) not appearing to be substantially fully unfolded or fully folded. At least a part of the folding region of the flexible display 220 may be formed of a curved surface having a certain curvature. In this case, the curvature may be smaller than that in the folded state.

According to an embodiment of the disclosure, when the first folding state or the second folding state is the folded state, the first housing 211 and the second housing 212, or the second housing 212 and the third housing 213 may be arranged to face each other. According to an embodiment of the disclosure, in the folded state, the surface of the first display region 221 of the flexible display 220 and the surface of the second display region 222 of the flexible display 220 may be arranged to face each other in opposite directions, and the surface of the second display region 222 of the flexible display 220 and the surface of the third display region 223 of the flexible display 220 may be arranged to face in contact with each other. According to an embodiment of the disclosure, in the folded state, the surface of the first display region 221 and the surface of the second display region 222, or the surface of the second display region 222 and the surface of the third display region 223 may be arranged to form an angle (e.g., 10 degrees or less) close to 0 degree. In this case, at least a part of the folding region of the flexible display 220 may be formed with a curved surface having a certain curvature. The curvature may be greater than that in the intermediate state.

According to an embodiment of the disclosure, when the first folding state or the second folding state is the folded state, the first display region 221 and the second display region 222, and/or the second display region 222 and the third display region 223 may not directly contact each other by a protection member. When the first display region 221 and the second display region 222, or the second display region 222 and the third display region 223 directly contact each other, a friction may be provided between the display regions of the flexible display 220 due to an external impact (e.g., a drop). The friction provided between the display regions may damage the surfaces of the first display region 221, the second display region 222, and/or the third display region 223. Accordingly, the electronic device 101 of an embodiment of the disclosure may prevent the display regions of the flexible display 220 from contacting each other by the protection member, and prevent some regions of the flexible display 220 from being damaged due to the external impact.

A display active region shown in FIG. 3A-3I indicate a region in which a display is in an active state among the first display region 221 to the third display region 223 of the flexible display 220. The active state may be a state in which power turns ON, that is, a general use state of the display. For another example, an inactive state may be at least one of a display power-off state, a current consumption minimization mode, a display dimming mode, and an always on display (AOD) mode. An authentication information acquisition region shown in FIG. 3A-3I is a region in which an input device (e.g., the camera 241 and/or the fingerprint input device 242) detection and acquiring information for user authentication from the outside is arranged. According to an embodiment of the disclosure, when the camera 241 and the fingerprint input device 242 are arranged in the first housing 211, the authentication information acquisition region may be a front surface of the first housing 211.

Figure 3A:
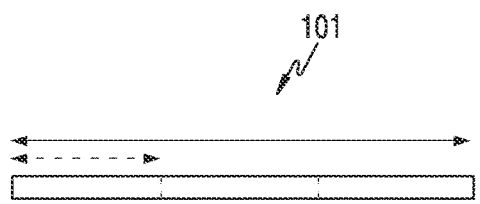
FIGS. 3A, 3B, 3C, 3D, 3E, 3F, 3G, 3H, and 3I illustrate a folding state of an electronic device according to an embodiment of the disclosure.

FIG. 3A is a diagram illustrating a folding state of the electronic device 101 when all of a first folding state and a second folding state are unfolded states. In this case, the first display region 221, the second display region 222, and the third display region 223 may all be active regions, and even the authentication information acquisition region in which the camera 241 and the fingerprint input device 242 are located may also be in an active state. When all of the first folding state and the second folding state are the unfolded states, the state of the electronic device 101 may be a fully unfolded state. This is hereinafter referred to as an A unfolded state.

Figure 3B:
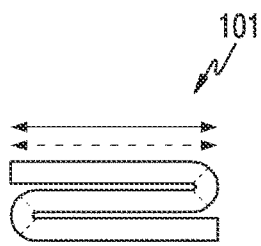

FIG. 3B is a diagram illustrating a folding state of the electronic device 101 when all of the first folding state and the second folding state are folded states. In this case, the first display region 221 may be in an active state, and the second display region 222 and the third display region 223 may be in an inactive state, and the authentication information acquisition region in which the camera 241 and the fingerprint input device 242 are located may be in the active state. When all of the first folding state and the second folding state are the folded states, the folding state of the electronic device 101 may be a fully folded state. This is hereinafter referred to as a B folding state.

Figure 3C:
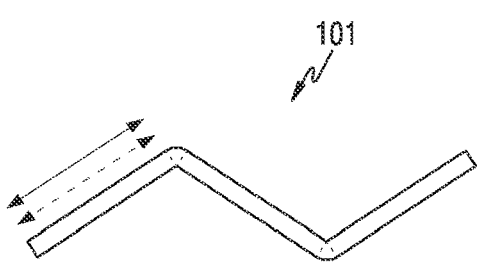

FIG. 3C is a diagram illustrating a folding state of the electronic device 101 when all of the first folding state and the second folding state are intermediate states. In this case, the first display region 221 may be in an active state, and the second display region 222 and the third display region 223 may be in the inactive state, and the authentication information acquisition region in which the camera 241 and the fingerprint input device 242 are located may be in the active state. Hereinafter, when all of the first folding state and the second folding state used as shown in FIG. 3C are the intermediate states, it is referred to as a C folding state.

Figure 3D:
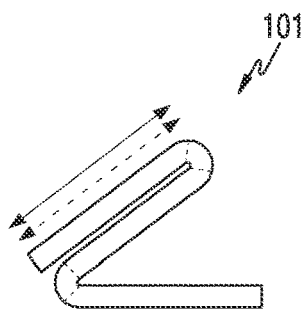

FIG. 3D is a diagram illustrating a folding state of the electronic device 101 when the first folding state is a folded state and the second folding state is an intermediate state. In this case, the first display region 221 is in an active state, and the second display region 222 and the third display region 223 are in an inactive state, and the authentication information acquisition region in which the camera 241 and the fingerprint input device 242 are located may be in the active state. Hereinafter, when the first folding state used as in FIG. 3D is the folded state and the second folding state is the intermediate state, it is referred to as a D folding state.

Figure 3E:
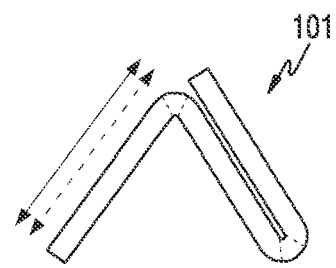

FIG. 3E is a diagram illustrating a folding state of the electronic device 101 when the first folding state is an intermediate state and the second folding state is a folded state. In this case, the first display region 221 may be in an active state, and the second display region 222 and the third display region 223 may be in an inactive state, and the authentication information acquisition region in which the camera 241 and the fingerprint input device 242 are located may be in the active state. Hereinafter, when the first folding state used as in FIG. 3E is the intermediate state and the second folding state is the folded state, it is referred to as an E folding state.

Figure 3F:
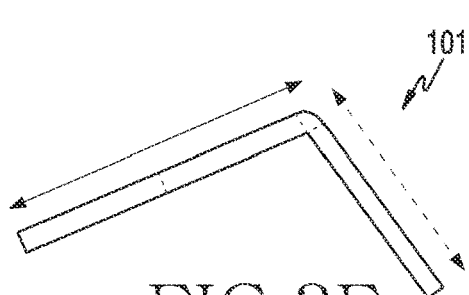

FIG. 3F is a diagram illustrating a folding state of the electronic device 101 when the first folding state is an unfolded state and the second folding state is an intermediate state. In this case, the first display region 221 and the second display region 222 may be in an active state, the third display region 223 may be in an inactive state, and the authentication information acquisition region in which the camera 241 and the fingerprint input device 242 are located may be in an active state. Hereinafter, when the first folding state used as in FIG. 3F is the unfolded state and the second folding state is the intermediate state, it is referred to as an F folding state.

Figure 3G:
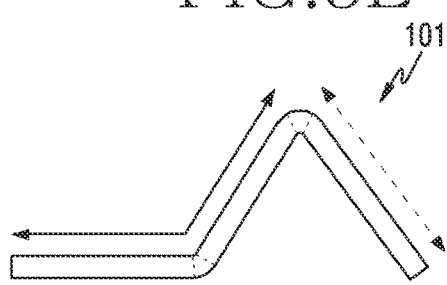

FIG. 3G is a diagram illustrating a folding state of the electronic device 101 when the first folding state is an intermediate state and the second folding state is the intermediate state. In this case, the first display region 221 and the second display region 222 may be in an active state, and the third display region 223 may be in an inactive state, and the authentication information acquisition region in which the camera 241 and the fingerprint input device 242 are located may be in the active state. Hereinafter, when the first folding state used as in FIG. 3G is the intermediate state and the second folding state is the intermediate state, it is referred to as a G folding state.

Figure 3H:
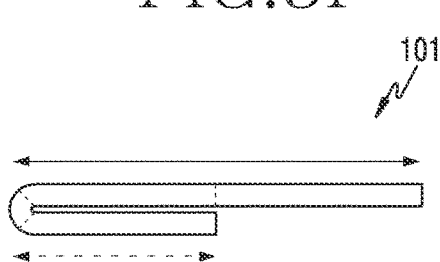

FIG. 3H is a diagram illustrating a folding state of the electronic device 101 when the first folding state is a folded state and the second folding state is an unfolded state. In this case, the first display region 221 may be in an inactive state, and the second display region 222 and the third display region 223 may be in an active state, and the authentication information acquisition region in which the camera 241 and the fingerprint input device 242 are located may be in the inactive state. Hereinafter, when the first folding state used as in FIG. 3H is the folded state and the second folding state is the unfolded state, it is referred to as an H folding state.

Figure 3I:
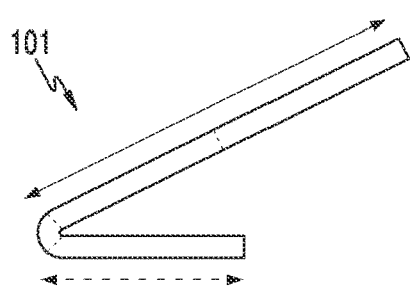

FIG. 3I is a diagram illustrating a folding state of the electronic device 101 when the first folding state is an intermediate state and the second folding state is an unfolded state. In this case, the first display region 221 may be in an inactive state, and the second display region 222 and the third display region 223 may be in an active state, and the authentication information acquisition region in which the camera 241 and the fingerprint input device 242 are located may be in the inactive state. Hereinafter, when the first folding state used as in FIG. 3I is the intermediate state and the second folding state is the unfolded state, it is referred to as an I folding state.

According to an embodiment of the disclosure, the A unfolded state or the H folding state is a structure in which the electronic device 101 itself does not stand up without a separate accessory (e.g., a cradle), and may be understood as a case in which the electronic device 101 is gripped and used by a user. In this case, the user may check more detailed information through a wide display screen.

According to an embodiment of the disclosure, in the B folding state, the electronic device 101 may protect the folded and hidden second display region 222 and third display region 223, and may be in a state of being easy to carry. In the B folding state, the user may check simpler information through a narrow display screen, and may check the details by unfolding the folded electronic device 101. For example, when detecting that the folding state is changed from a fully folded state to a fully unfolded state, the electronic device 101 may output, in a detailed information form, a message outputted in a summary form.

According to an embodiment of the disclosure, when the electronic device 101 is in the C folding state to G folding state and/or the I folding state, the electronic device 101 may operate in a tabletop mode. The tabletop mode is a structure in which the electronic device 101 itself stands up without a separate accessory (e.g., a cradle), and may be understood as a case in which the electronic device 101 is placed and used on the Earth's surface or an object. According to an embodiment of the disclosure, when the electronic device 101 is in the C folding state to G folding state and/or the I folding state, the electronic device 101 may be erected and fixed, without using a separate fixing device or being gripped by a user's hand. Accordingly, it is easy for a user to gaze at the electronic device 101 in a standby state, and it is possible to present the user with better usability (e.g., camera shooting, a video call, or personal broadcasting in a state in which both hands are free). For example, when the electronic device 101 operates in the tabletop mode, the electronic device 101 may display a user interface (UI) (e.g., a clock UI and/or a notification UI) of an always on display (AOD) mode in a display region as well.

TABLE 1

| Classification | Folding state of electronic device |
| --- | --- |
| Classification I | A unfolded state, B folding state |
| Classification II | C folding state to E folding state |
| Classification III | F folding state, G folding state |
| Classification IV | H folding State, I folding State |

According to an embodiment of the disclosure, the A unfolded state to the I folding state may be classified as in Table 1 above. The A unfolded state and the B folding state may be states in which it is assumed that the authentication information acquisition region is in an active state and the user is using the electronic device 101 in his hand. For example, the A unfolded state and the B folding state may be cases in which there is no restriction on an interaction between the user and the electronic device 101. These may be grouped into Classification I. The C folding state to the E folding state may be a state in which it is assumed that the authentication information acquisition region is in the active state and the user is using the electronic device 101 placed on the Earth's surface or an object. For example, the C folding state to the E folding state may be cases in which there are some restrictions on an interaction between the user and the electronic device 101. These may be grouped into Classification II. The F folding state and the G folding state may be cases in which the authentication information acquisition region is in the active state, and an input device (e.g., the camera 241 and/or the fingerprint input device 242) for user authentication is off. These may be grouped into Classification III. The H folding state and the I folding state may be cases in which the authentication information acquisition region is in an inactive state, and the authentication information acquisition region is completely hidden, and the first display region 221 is off. These may be grouped into Classification IV.

The classification in Table 1 is an example and the disclosure is not limited thereto. For example, various classifications may be made according to whether the display of the authentication information acquisition region is in an active state, whether there is a restriction on an interaction between the user and the electronic device 101, and/or whether the authentication information acquisition region is completely hidden.

Figure 4:
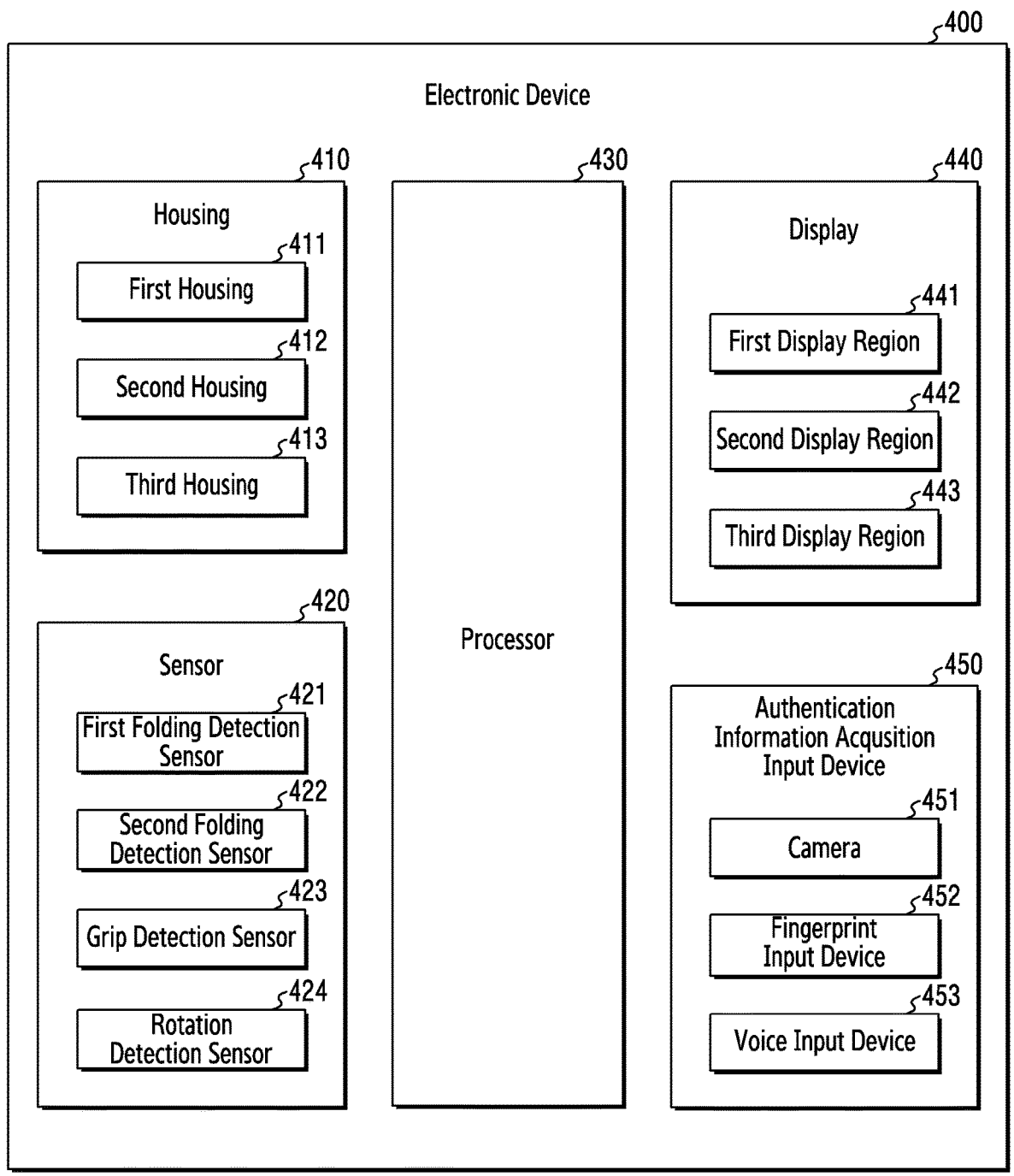
FIG. 4 is a block diagram illustrating an electronic device according to an embodiment of the disclosure.

FIG. 4 is a block diagram illustrating an electronic device according to an embodiment of the disclosure.

Referring to FIG. 4, an electronic device 400 of an embodiment of the disclosure may include a housing 410 (e.g., the foldable housing 210 of FIG. 2), a sensor 420 (e.g., the sensor module 176 of FIG. 1), a processor 430 (e.g., the processor 120 of FIG. 1), a display 440 (e.g., the display device 160 of FIG. 1, the flexible display 220 of FIG. 2), and an authentication information acquisition input device 450 (e.g., the camera module 180 of FIG. 1, the sensor module 176), and may further include, although not illustrating, a memory (e.g., the memory 130 of FIG. 1) or a battery (e.g., the battery 189 of FIG. 1).

Similarly to the housing 210 of FIG. 2, the housing 410 of an embodiment of the disclosure may form an appearance of the electronic device 400, and may have a space for arranging components (e.g., a sensor, or the like) constituting the electronic device 400. According to an embodiment of the disclosure, the housing 410 may include a first housing 411, a second housing 412 foldable around a first folding axis with respect to the first housing 411, and a third housing 413 foldable around a second folding axis with the second housing 412. For example, the housing 410 may be divided into the first housing 411 and the second housing 412 with a criterion of the first folding axis, and may be divided into the second housing 412 and the third housing 413 with a criterion of the second folding axis.

According to an embodiment of the disclosure, the sensor 420 may include a first folding detection sensor 421, a second folding detection sensor 422, a grip detection sensor 423, and a rotation detection sensor 424.

According to an embodiment of the disclosure, the first folding detection sensor 421 may detect a first folding state of the first housing 411 and the second housing 412, and the second folding detection sensor 422 may detect a second folding state of the second housing 412 and the third housing 413. According to an embodiment of the disclosure, the first folding detection sensor 421 and/or the second folding detection sensor 422 may be at least one of an acceleration sensor, a gyro sensor, a geomagnetic sensor, and a Hall sensor, or may be a device (or sensor) for detecting a folding state by using information acquired by at least one of them. However, the disclosure is not limited thereto, and various sensors capable of obtaining information on an angle at which the housing is folded may be used. For example, the acceleration sensor may detect information on a linear motion of the electronic device 400 and/or a three-axis acceleration of the electronic device 400. The gyro sensor may detect information related to the rotation of the electronic device 400, and the geomagnetic sensor may detect information on a direction in which the electronic device 400 goes in an absolute coordinate system. The Hall sensor may be a magnetic sensor, and may be arranged in a hinge region (e.g., the hinge assembly of FIG. 2) of the electronic device 400 or in a region coming in contact when the electronic device 400 is folded. According to an embodiment of the disclosure, a digital Hall sensor among the Hall sensors may be a geomagnetic sensor, and the digital Hall sensor may detect the change of a magnetic field by magnetism and determine the opening or closing of the electronic device 400 and opening/closing information (e.g., a folded angle). According to an embodiment of the disclosure, the Hall sensor (e.g., the digital Hall sensor) may be auxiliary or additionally used to determine a folding state of the electronic device 400, together with the acceleration sensor, the gyro sensor, and/or the geomagnetic sensor.

According to an embodiment of the disclosure, the grip detection sensor 423 may be connected to the housing 410 of the electronic device 400, and may use a variety of sensors for detecting whether the electronic device 400 is gripped by a user, based on a state in which a user's body is in contact with the housing 410 of the electronic device 400. For example, the grip detection sensor 423 may use a grip sensor, and when a gesture of surrounding the housing 410 of the electronic device 400 is recognized by the grip sensor, the processor 430 may determine that the electronic device 400 is gripped by the user. For another example, the grip detection sensor 423 may use a touch panel, and when the touch panel detects a large-area contact between the housing 410 of the electronic device 400 and the user's body, the processor 430 may determine that the electronic device 400 is gripped by the user.

According to an embodiment of the disclosure, the rotation detection sensor 424 may use various types of sensors capable of detecting whether the electronic device 400 is rotated, and may determine whether the electronic device 400 is used in a landscape mode or is used in a portrait mode. For example, the rotation detection sensor 424 may use a gyro sensor, and the processor 430 may determine the type (e.g., a landscape mode or a portrait mode) of a mode in which the electronic device 400 is used, based on the change of an angular velocity of the electronic device 400 detected by the gyro sensor, that is, the extent of rotation of the electronic device 400.

According to an embodiment of the disclosure, the processor 430 may include a generic processor configured to execute a hardware module or software (e.g., an application program). The processor 430 may control a hardware component (function) including at least one of various sensors of the electronic device 400, a data measurement module, an input/output interface, a module for managing a state or environment of the electronic device 400, and a communication module, or a software element (program).

According to an embodiment of the disclosure, the processor 430 may determine a user authentication scheme from among a plurality of user authentication schemes, based on a folding state of the electronic device 400 according to a first folding state and a second folding state, and may control an input device corresponding to the determined user authentication scheme among at least one authentication information acquisition input device 450 to acquire authentication information.

According to an embodiment of the disclosure, the display 440 may visually present information to the outside (e.g., a user) of the electronic device 400 and may display various contents (e.g., a text, an image, a video, an icon, or a symbol). For example, the display 440 may include a display panel, a hologram device or projector, and a control circuit (e.g., a display driver IC (DDI)) for controlling the corresponding device. According to an embodiment of the disclosure, the display 440 may include touch circuitry configured to detect a touch, or a sensor circuit (e.g., a pressure sensor) configured to measure the intensity of a force provided by the touch, and may receive a touch, gesture, proximity, or hovering input that uses an electronic pen or a part of a user's body. According to an embodiment of the disclosure, at least a part of the display 440 may be made of flexible material, and a corresponding region may be bent when a force is applied.

According to an embodiment of the disclosure, the display 440 may include a first display region 441 (e.g., the first display region 221 of FIG. 2), a second display region 442 (e.g., the second display region 222 of FIG. 2), and a third display region 443 (e.g., the third display region 223 of FIG. 2). According to an embodiment of the disclosure, the display 440 may be divided into the first display region 441 and the second display region 442 with a criterion of the first folding axis, and may be divided into the second display region 442 and the third display region 443 with a criterion of the second folding axis.

According to an embodiment of the disclosure, the display 440 may present a rectangular screen. In various embodiments of the disclosure, the shape of the screen presented by the display 440 is not limited to a rectangle, but may include a square with rounded corners, a circle, a square having a notch region, and a square having a circular hole in some regions, according to the type or design of the electronic device 400. In the disclosure, for convenience of description, it is assumed that the display 440 has a rectangular shape and is a square in which a width of the display 400 is greater than a length, but various modifications are possible.

According to an embodiment of the disclosure, the authentication information acquisition input device 450 (or "input device") may acquire authentication information for performing user authentication that is based on a plurality of user authentication schemes, and may perform user authentication by using user's unique information (e.g., a shape of the face, a pattern of the iris, a depth of the face, and/or a shape of the blood vessel flowing in the face). According to an embodiment of the disclosure, the authentication information acquisition input device 450 may include a camera 451 (e.g., the camera 241 of FIG. 2), a fingerprint input device 452 (e.g., the fingerprint input device 242 of FIG. 2), and a voice input device 453. The authentication information acquisition input device 450 may detect user's unique information by using the camera 451, the fingerprint input device 452, or the voice input device 453, under the control of the processor 430, and may perform user authentication by comparing the detected user's unique information and previously stored reference user's unique information.

According to an embodiment of the disclosure, the camera 451 may include an image sensor, an red, green, and blue (RGB) camera, an infrared camera, and/or a depth camera (e.g., a time of flight (ToF) camera, a structured light (SL) camera), and when a user's face approaches within a predetermined distance, the camera 451 may perform photographing in order to acquire user's unique information (e.g., the shape of the face, the pattern of the iris, the depth of the face, the shape of the blood vessel flowing in the face, and/or liveness). A method for performing the user authentication by using the acquired user's unique information may include a method of user identification based on the shape of the face and/or the depth of the face, user identification based on the pattern of the iris, user identification based on the shape of the blood vessel in the face, and/or user identification based on a pulse on the face and a movement of the face.

According to an embodiment of the disclosure, when a fingerprint region of the finger comes into contact with the fingerprint input device 452, the fingerprint input device 452 may perform user authentication by comparing fingerprint information acquired through fingerprint recognition and unique information (e.g., the form of fingerprint) on a user's fingerprint previously stored in the electronic device 400.

According to an embodiment of the disclosure, the voice input device 453 may include a microphone, and may detect sound information. The voice input device 453 may perform user authentication by comparing voice information acquired through voice recognition and unique information on a user's voice previously stored in the electronic device 400.

According to an embodiment of the disclosure, a memory (e.g., the memory 130 of FIG. 1) may store various data (e.g., detected data) used by at least one component (e.g., the processor 430) of the electronic device 400. For example, the data may include input data or output data about software (e.g., the program 140 of FIG. 1) and a command related thereto. The memory may include a volatile memory and a non-volatile memory.

A battery (e.g., the battery 189 of FIG. 1) of an embodiment of the disclosure may be configured to store power required for the electronic device 400. For example, the battery may include a lithium-ion battery or capacitor, and may be rechargeable or replaceable. According to an embodiment of the disclosure, the battery may be charged using power (e.g., a direct current signal (direct current power)) presented from a charging circuit.

Figure 5:
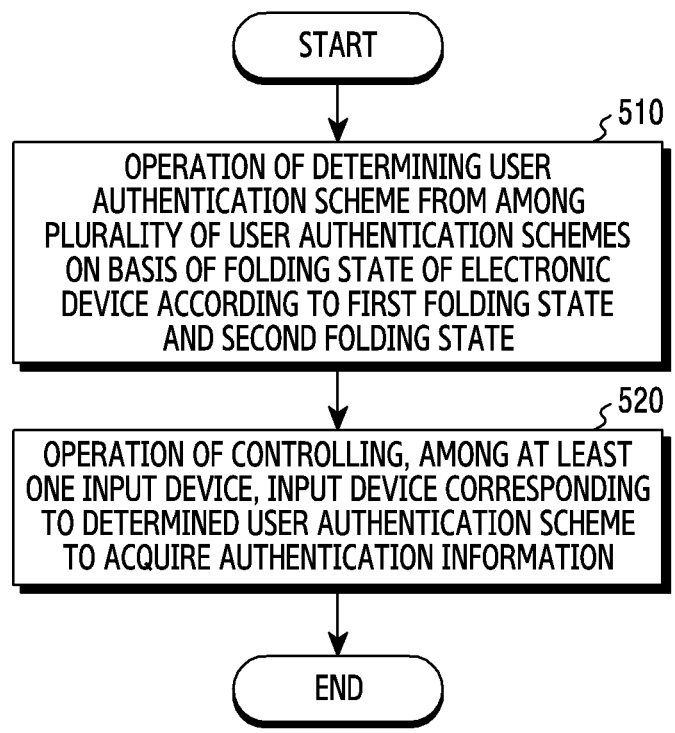
FIG. 5 is a flowchart illustrating a method for acquiring user authentication information of an electronic device according to an embodiment of the disclosure.

FIG. 5 is a flowchart illustrating a method for acquiring user authentication information of an electronic device according to an embodiment of the disclosure.

The operation of FIG. 5 may be performed by the electronic device 400 of FIG. 4. Referring to FIG. 5, the processor 430 of the electronic device 400 of an embodiment of the disclosure may perform operation 510 of determining a user authentication scheme from among a plurality of user authentication schemes, based on a folding state of the electronic device 400 according to a first folding state and a second folding state, and operation 520 of controlling an input device corresponding to the determined user authentication scheme among at least one input device 450 to acquire authentication information.

In operation 510, the processor 430 of an embodiment of the disclosure may determine the user authentication scheme from among the plurality of user authentication schemes, based on a state (e.g., the A unfolded state to the I folding state) of the electronic device 400 according to the first folding state of the first housing 411 and the second housing 412 of the electronic device 400 and the second folding state of the second housing 412 and the third housing 413 of the electronic device 400. The plurality of user authentication schemes are schemes capable of authenticating a user by using authentication information acquired from the input device 450 of the electronic device 400, and may be a function that is pre-installed when the electronic device 400 is manufactured. For example, the plurality of user authentication schemes may include fingerprint authentication, face authentication, iris authentication, voice authentication, password authentication, personal identification number (PIN) number authentication, and/or pattern authentication. According to an embodiment of the disclosure, the processor 430 may determine one user authentication scheme from among the plurality of user authentication schemes installed in the electronic device 400 based on user convenience and/or security. In the disclosure, it is assumed that the plurality of user authentication schemes installed in the electronic device 400 are fingerprint authentication, face authentication, iris authentication, voice authentication, password authentication, PIN number authentication, and pattern authentication.

In operation 520, the processor 430 of an embodiment of the disclosure may control the input device 450 corresponding to the user authentication scheme determined in operation 510 among at least one input device 450, to acquire authentication information. For example, when the user authentication scheme of fingerprint authentication is determined in operation 510, the processor 430 may control the fingerprint input device 452 to acquire information on a user's fingerprint, and when the user authentication scheme of face authentication is determined in operation 520, the processor 430 may control the camera 451 to acquire information on a user's face shape, and when the user authentication scheme of voice authentication is determined in operation 530, the processor 430 may control the voice input device (453) to acquire information on a user's voice.

Hereinafter, the flow of operation 510 of an embodiment will be described with reference to the drawings.

FIG. 6 is a flowchart illustrating a method for determining a user authentication scheme of an electronic device according to an embodiment of the disclosure.

Referring to FIG. 6, operation 510 of FIG. 5 may include operation 610 of confirming at least one candidate authentication scheme set to be usable according to a situation in which it is necessary to acquire authentication information among a plurality of user authentication schemes, and operation 620 of, when the at least one candidate authentication scheme is plural, determining a user authentication scheme from among a plurality of candidate authentication schemes, based on a folding state.

In operation 610, the processor 430 of an embodiment of the disclosure may confirm the at least one candidate authentication scheme set to be usable according to a situation in which it is necessary to acquire authentication information among the plurality of user authentication schemes installed in the electronic device 400. The situation in which it is necessary to acquire authentication information may be a situation in which an event for acquiring authentication information has occurred, and may include, for example, an event for acquiring authentication information in order to unlock on a standby screen or an event for acquiring authentication information because of a need for security while using an application. The at least one candidate authentication scheme set to be usable may be a list of user authentication schemes preset to be usable according to an event. For example, in the case of a standby screen unlock event, the user authentication scheme of fingerprint authentication, face authentication, or pattern authentication may be set by a user as a usable candidate authentication scheme. For another example, in the case of an event for acquiring authentication information while using an application, a required security level may be different depending on the type of the application, and accordingly, a candidate authentication scheme set to be usable may be different. When security is required in a banking application, the user authentication scheme of password authentication or fingerprint authentication may be set as a usable candidate authentication scheme. When security is required in a gallery application, the user authentication scheme of fingerprint authentication, face authentication, iris authentication, password authentication, PIN number authentication or pattern authentication may be set as a usable candidate authentication scheme.

When the at least one candidate authentication scheme confirmed in operation 610 is plural, the processor 430 of an embodiment may, in operation 620, determine a user authentication scheme from among a plurality of candidate authentication schemes, based on a folding state of the electronic device 400. Table 2 below is an example of determining the user authentication scheme according to the folding state of the electronic device 400.

TABLE 2

| Classification | Folding state of electronic device | User authentication scheme determined |
| --- | --- | --- |
| Classification I | A unfolded state, B folding state | face authentication, iris authentication, fingerprint authentication, voice authentication, password authentication, PIN number authentication, pattern authentication |
| Classification II | C folding state to E folding state | face authentication, iris authentication, voice authentication |
| Classification III | F folding state, G folding state | voice authentication, password authentication, PIN number authentication, pattern authentication |
| Classification IV | H folding state, I folding state | voice authentication, password authentication, PIN number authentication, pattern authentication |

Referring to Table 2, when the folding state of the electronic device 400 belongs to classification I (e.g., when an authentication information acquisition region is in an active state, and there is not a restriction on an interaction between the electronic device 400 and a user), the processor 430 of an embodiment of the disclosure may determine face authentication, iris authentication, fingerprint authentication, voice authentication, password authentication, PIN number authentication, and/or pattern authentication scheme, as a user authentication scheme. According to an embodiment of the disclosure, when the folding state of the electronic device 400 belongs to classification II (e.g., when the authentication information acquisition region is in the active state and there are some restrictions on the interaction between the electronic device 400 and the user), the processor 430 may determine face authentication, iris authentication, and/or voice authentication scheme as the user authentication scheme. According to an embodiment of the disclosure, when the folding state of the electronic device 400 belongs to classification III (e.g., when the authentication information acquisition region is in an inactive state and is not a real used surface), the processor 430 may determine voice authentication, password authentication, PIN number authentication, and/or pattern authentication scheme, as the user authentication scheme. According to an embodiment of the disclosure, when the folding state of the electronic device 400 belongs to classification IV (e.g., when the authentication information acquisition region is in the inactive state and is fully hidden and power turns off), the processor 430 may determine voice authentication, password authentication, PIN number authentication, and/or pattern authentication scheme, as the user authentication scheme. The method of determining the user authentication scheme described in Table 2 is an example, and besides this, various methods of determining the user authentication scheme based on the folding state of the electronic device 400 may be applied.

Figure 7:
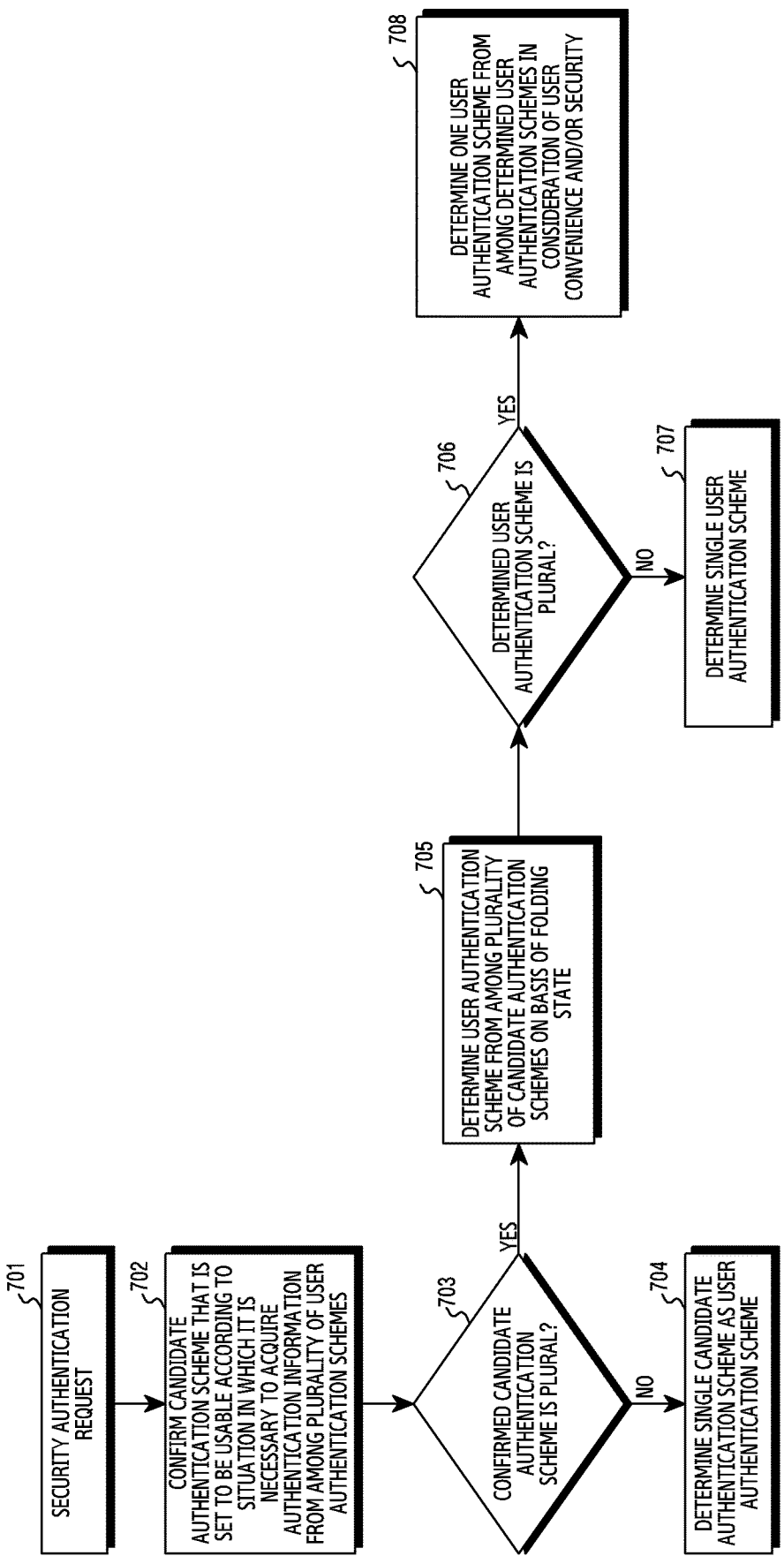
FIG. 7 is a flowchart illustrating a determination algorithm for determining a user authentication scheme of an electronic device according to an embodiment of the disclosure.

FIG. 7 is a flowchart illustrating a determination algorithm for determining a user authentication scheme of an electronic device according to an embodiment of the disclosure. The algorithm of FIG. 7 may explain operations of FIG. 6.

Referring to FIG. 7, in operation 701, the processor 430 may acquire a signal for requesting security authentication. In operation 702, the processor 430 may confirm a candidate authentication scheme set to be usable according to a situation in which it is necessary to acquire authentication information among a plurality of user authentication schemes, according to the request of operation 701. In operation 703, the processor 430 may determine whether the confirmed candidate authentication scheme is plural. When the confirmed candidate authentication scheme is single (703—No), in operation 704, the processor 430 may determine a single candidate authentication scheme as a user authentication scheme. When the candidate authentication scheme confirmed in operation 703 is plural (703—Yes), in operation 705, the processor 430 may determine a user authentication scheme from among the plurality of candidate authentication schemes, based on the folding state of the electronic device 400. In operation 706, the processor 430 may determine whether the determined user authentication scheme is plural. When the determined user authentication scheme is single (706—No), in operation 707, the processor 430 may finally determine the single user authentication scheme. When the user authentication scheme determined in operation 706 is plural (706—Yes), in operation 708, the processor 430 may determine one user authentication scheme from among the determined user authentication schemes based on user convenience and/or security. For example, in operation 708, the processor 430 may determine a scheme having the highest security level from among the plurality of user authentication schemes determined in operation 705. For another example, in operation 708, when a priority based on a user convenience is set to the plurality of user authentication schemes determined in operation 705, the processor 430 may determine a scheme having the highest priority.

Describing the standby screen unlock event as an example, when the processor 430 acquires a security authentication request from a standby screen, the processor 430 may confirm candidate authentication schemes of face authentication, voice authentication, password authentication, and pattern authentication set to be usable for unlocking. Since the confirmed candidate authentication scheme is plural, the processor 430 may determine the folding state of the electronic device 400 and, when the determined folding state is the C folding state, the processor 430 may determine face authentication and voice authentication schemes among the candidate authentication schemes of face authentication, voice authentication, password authentication, and pattern authentication, as user authentication schemes (referring to Table 2). Since the determined user authentication scheme is plural, the processor 430 may finally determine the face authentication scheme as the user authentication scheme based on security. Or, when the authentication schemes determined according to the folding state are given priorities established based on a user convenience, the processor 430 may finally determine a high-priority authentication scheme as the user authentication scheme. Or, the processor 430 may finally determine a user authentication scheme randomly among face authentication and voice authentication as well.

According to an embodiment of the disclosure, when one user authentication scheme is finally determined in operation 707 or operation 708, the processor 430 may control the display 440 to output a message for authentication information acquisition corresponding to the determined user authentication scheme, and may control an input device corresponding to the determined user authentication scheme to acquire authentication information (e.g., operation 520 of FIG. 5).

According to an embodiment of the disclosure, operation 702 of FIG. 7 may correspond to operation 610 of FIG. 6, and operations 703 and 705 of FIG. 7 may correspond to operation 620 of FIG. 6. Hereinafter, various embodiments of outputting a message for authentication information acquisition will be described with reference to FIGS. 8A, 8B, 8C, 8D, 9, 10A, 10B, 11A, and 11B.

FIGS. 8A, 8B, 8C, and 8D are diagrams illustrating a message output method for acquiring authentication information when a folding state of an electronic device belongs to classification I according to various embodiments of the disclosure.

Figure 8A:
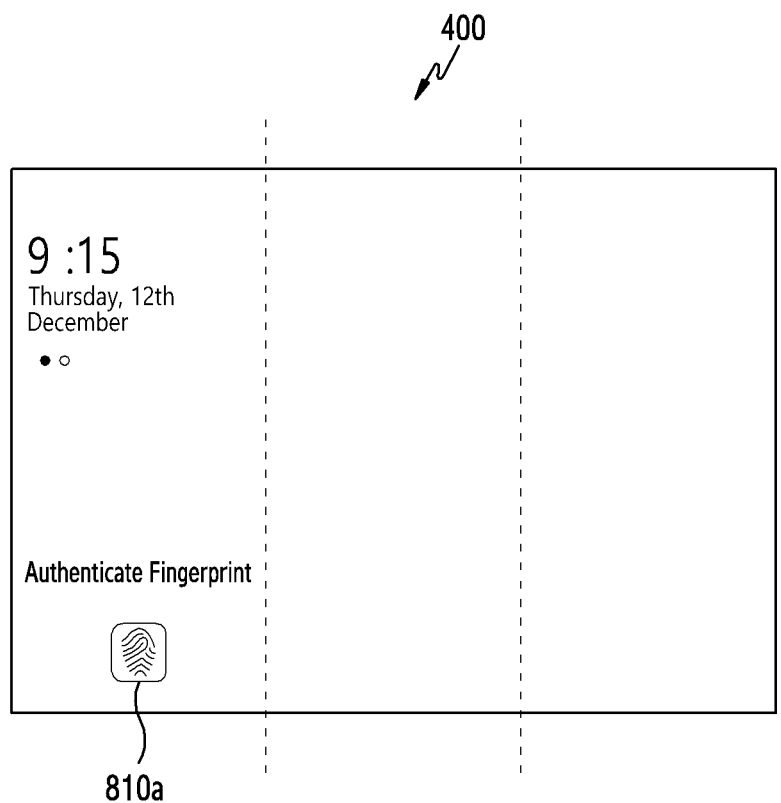
FIG. 8A is a diagram illustrating a method for outputting a message for authentication information acquisition when a folding state of an electronic device belongs to classification I according to an embodiment of the disclosure.
Figure 8B:
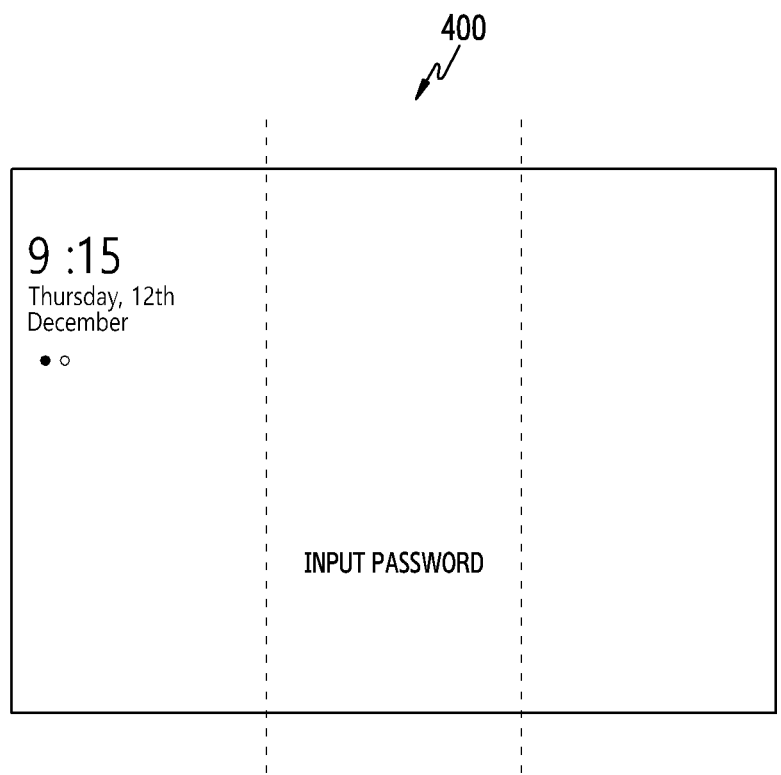
FIG. 8B is a diagram illustrating a method for outputting a message for authentication information acquisition when a folding state of the electronic device belongs to classification I according to an embodiment of the disclosure.

Referring to FIGS. 8A and 8B, they illustrate a message for authentication information acquisition being outputted from the display 440 when the electronic device 400 is in the A unfolded state and a user uses the electronic device 400 in a landscape mode (the longest edge among edges of the electronic device 400 is used as a horizontal orientation).

Figure 8C:
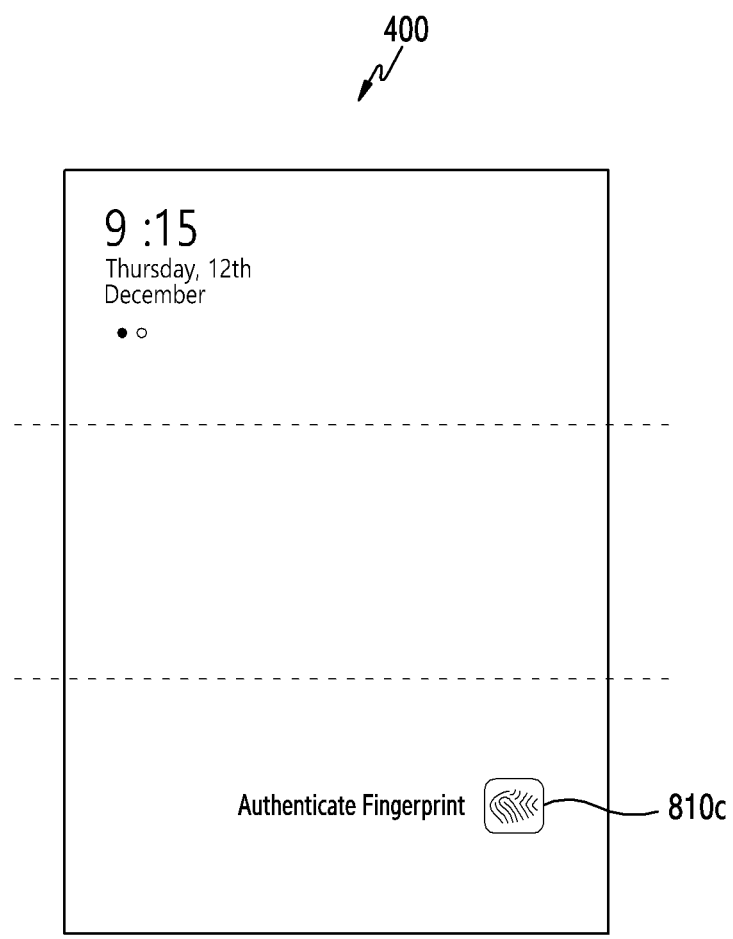
FIG. 8C is a diagram illustrating a method for outputting a message for authentication information acquisition when a folding state of the electronic device belongs to classification I according to an embodiment of the disclosure.

Referring to FIG. 8C, it illustrates a message for authentication information acquisition being outputted from the display 440 when the electronic device 400 is in the A unfolded state and the user uses the electronic device 400 in a portrait mode (the longest edge among edges of the electronic device 400 is used as a vertical orientation).

Figure 8D:
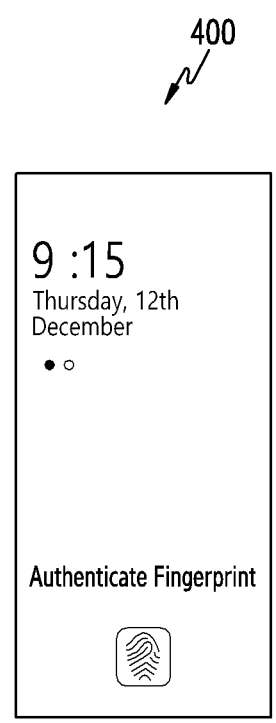
FIG. 8D is a diagram illustrating a method for outputting a message for authentication information acquisition when a folding state of the electronic device belongs to classification I according to an embodiment of the disclosure.

Referring to FIG. 8D, it illustrates a message for authentication information acquisition being outputted from the display 440 when the electronic device 400 is in the B folding state.

The camera 451 and the fingerprint input device 452 among the authentication information acquisition input devices 450 may be exposed to the outside of the housing 410, and may directly acquire information for user authentication from the outside. However, face authentication, iris authentication, and fingerprint authentication schemes using the camera 451 and/or the fingerprint input device 452 are inevitably dependent on positions of the camera 451 and the fingerprint input device 452 on the display 440, because the camera 451 and/or the fingerprint input device 452 are practically impossible to be arranged in all positions of the electronic device 400.

Figure 9:
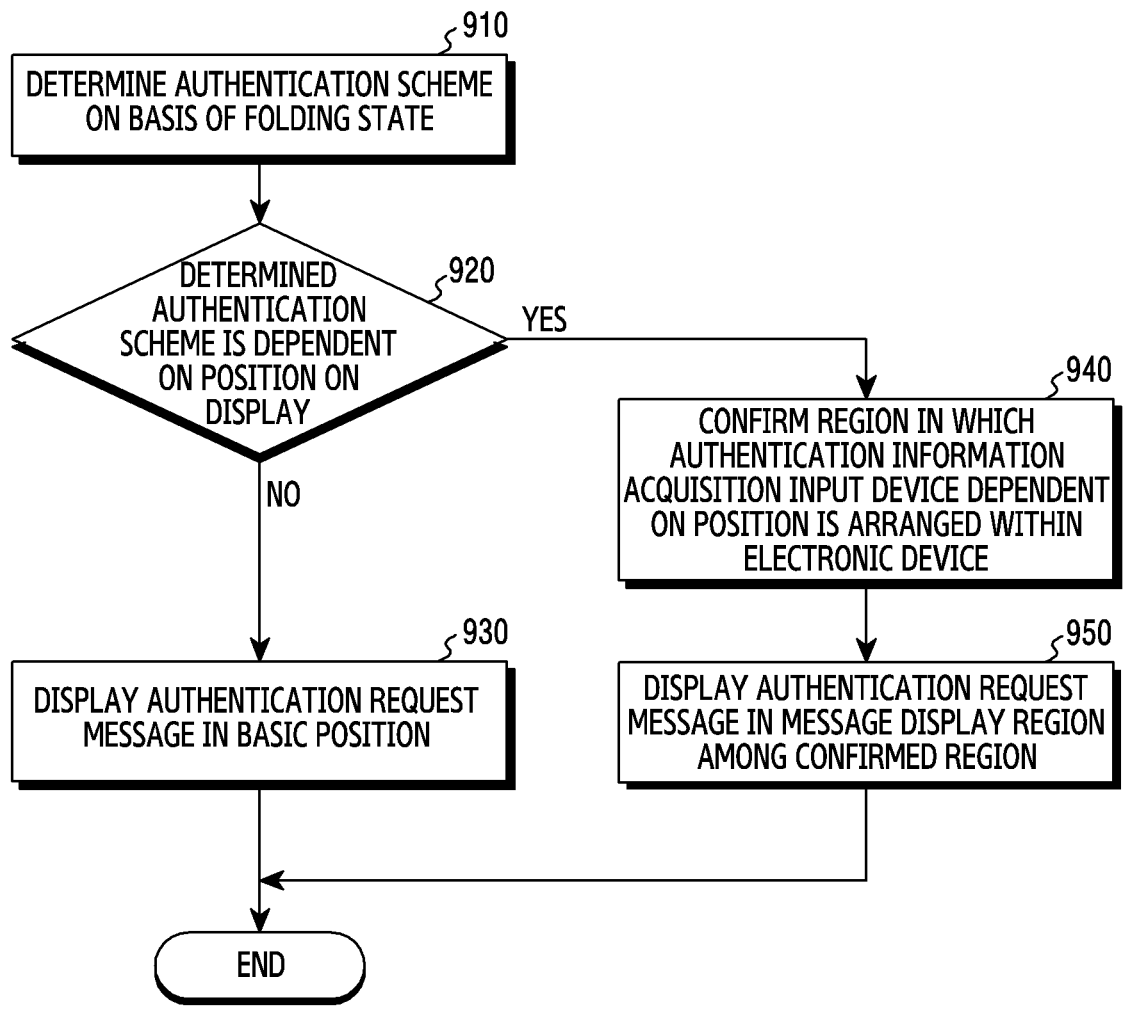
FIG. 9 is a flowchart illustrating a method for outputting a message for authentication information acquisition according to whether an authentication scheme determined in an electronic device is dependent on a position on a display according to an embodiment of the disclosure.

FIG. 9 is a flowchart illustrating a method for outputting a message for authentication information acquisition according to whether an authentication scheme determined in an electronic device is dependent on a position on a display according to an embodiment of the disclosure.

Referring to FIG. 9, in operation 910, the processor 430 may determine a user authentication scheme, based on a folding state. In operation 920, the processor 430 may determine whether the determined user authentication scheme is dependent on a position on the display. When it is not dependent on the position (920—No), in operation 930, the processor 430 may display a message of requesting user authentication on a default position of the display 440. The default position may be, for example, a center or bottom of an activated display 440 region. When the user authentication scheme is dependent on the position on the display (920—Yes), in operation 940, the processor 430 may confirm a region in which the position-dependent authentication information acquisition input device 450 (e.g., the fingerprint input device 452) is arranged in the electronic device 400. In operation 950, the processor 430 may display the message of requesting user authentication in a message display region among the confirmed region. The message display region may be, for example, near up, down, left, right orientations of a region in which the fingerprint input device 452 is positioned. For example, the user authentication scheme dependent on the position on the display may include a fingerprint authentication scheme.

Referring to FIG. 8A, when the fingerprint authentication scheme dependent on position is determined as the user authentication scheme, the processor 430 may a message (e.g., Enter your fingerprint) of requesting fingerprint authentication, nearby above a fingerprint input device 810*a* arranged in the first display region 441 of the electronic device 400. In FIG. 8A, unlike in FIG. 8B, a region in which the message is displayed may be biased to one side (left) within a region in which the display 440 is activated.

Figure 10A:
FIG. 10A is a diagram illustrating a method for outputting a message for authentication information acquisition when a folding state of an electronic device belongs to classification II according to an embodiment of the disclosure.
Figure 10B:
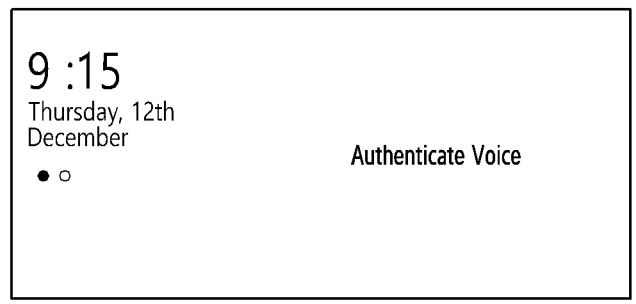
FIG. 10B is a diagram illustrating a method for outputting a message for authentication information acquisition when a folding state of an electronic device belongs to classification II according to an embodiment of the disclosure.

FIGS. 10A and 10B are diagrams illustrating a method for outputting a message for authentication information acquisition when a folding state of an electronic device belongs to classification II according to various embodiments of the disclosure.

Referring to FIG. 10A, when the electronic device 400 is in the C folding state to the E folding state, the processor 430 may display an authentication information acquisition message in order to acquire authentication information corresponding to face authentication that is a determined user authentication scheme. Referring to FIG. 10B, when the electronic device 400 is in the C folding state to the E folding state, the processor 430 may display an authentication information acquisition message in order to acquire authentication information corresponding to voice authentication that is the determined user authentication scheme.

Figure 11A:
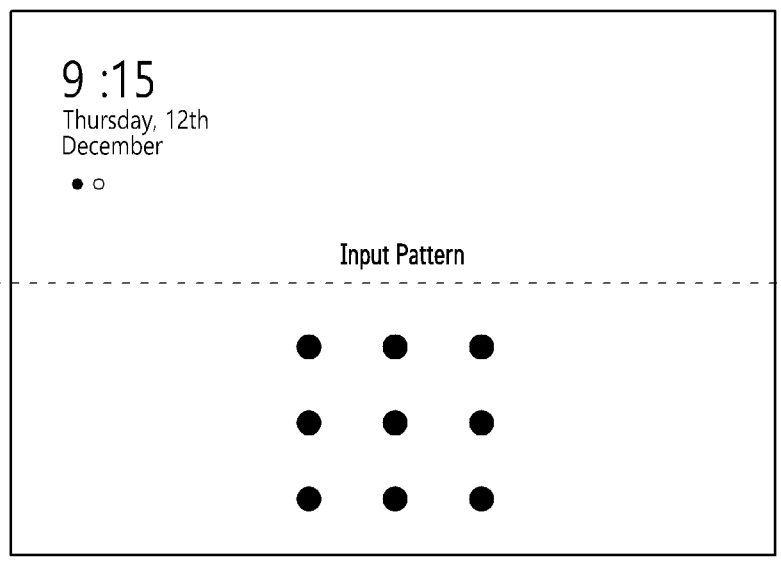
FIG. 11A is a diagram illustrating a method for outputting a message for authentication information acquisition when a folding state of an electronic device belongs to classification III or classification IV according to an embodiment of the disclosure.
Figure 11B:
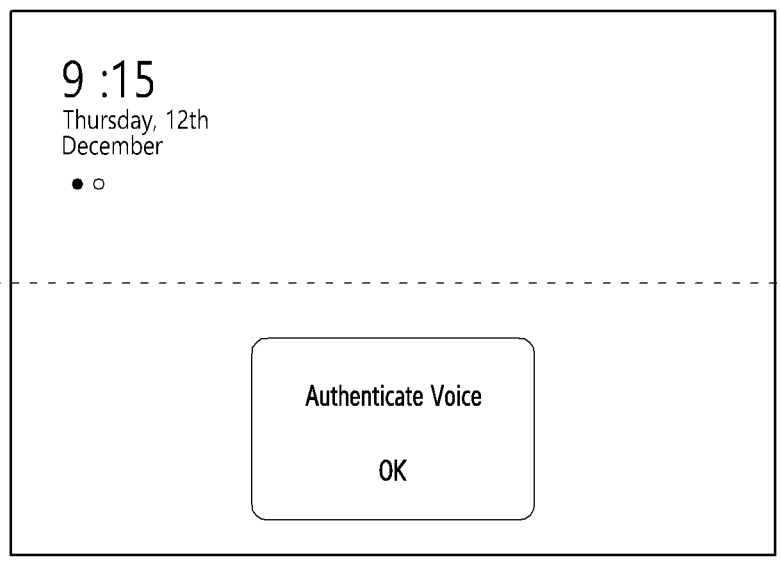
FIG. 11B is a diagram illustrating a method for outputting a message for authentication information acquisition when a folding state of an electronic device belongs to classification III or classification IV according to an embodiment of the disclosure.

FIGS. 11A and 11B are diagrams illustrating a method for outputting a message for authentication information acquisition when a folding state of an electronic device belongs to classification III or classification IV according to various embodiments of the disclosure.

Referring to FIG. 11A, when the electronic device 400 is in the F folding state to the I folding state, the processor 430 may display an authentication information acquisition message in order to acquire authentication information corresponding to pattern authentication that is a determined user authentication scheme. Referring to FIG. 11B, when the electronic device 400 is in the F folding state to the I folding state, the processor 430 may display an authentication information acquisition message in order to acquire authentication information corresponding to voice authentication that is the determined user authentication scheme.

Figure 12:
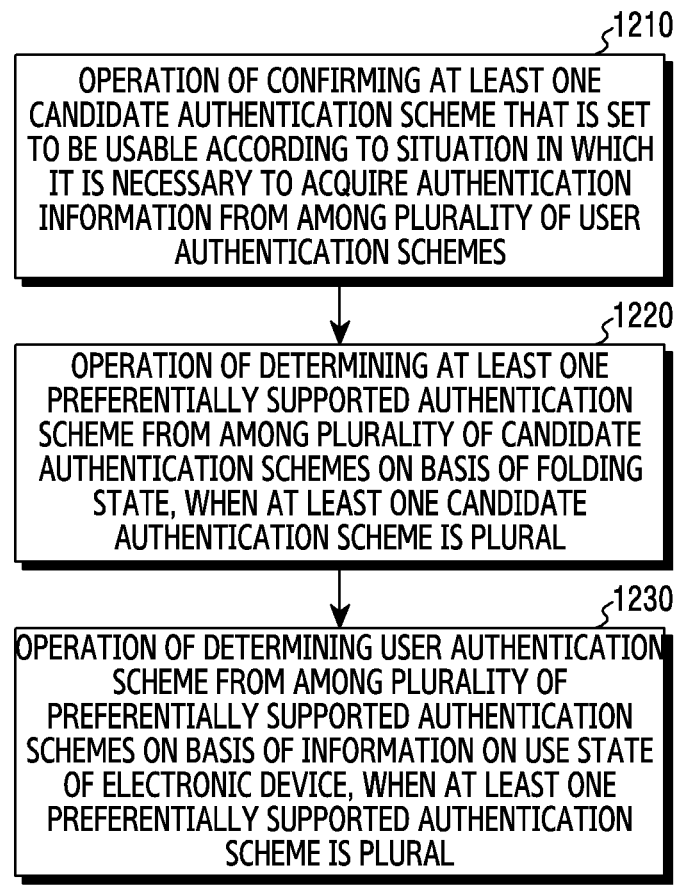
FIG. 12 is a flowchart illustrating a method for determining a user authentication scheme of an electronic device according to an embodiment of the disclosure.

FIG. 12 is a flowchart illustrating a method for determining a user authentication scheme of an electronic device according to an embodiment of the disclosure.

Referring to FIG. 12, operation 510 of FIG. 5 may include operation 1210 of confirming at least one candidate authentication scheme set to be usable according to a situation in which it is necessary to require acquisition of authentication information among a plurality of user authentication schemes, operation 1220 of, when the at least one candidate authentication scheme is plural, determining at least one preferentially supported authentication scheme from among the plurality of candidate authentication schemes, based on a folding state, and operation 1230 of, when the at least one preferentially supported authentication scheme is plural, determining a user authentication scheme from among the plurality of preferentially supported authentication schemes, based on information on a use state of the electronic device.

According to an embodiment of the disclosure, operation 1220 may be omitted in operations 1210 to 1230 of FIG. 12. For example, the processor 430 may confirm the at least one candidate authentication scheme set to be usable according to the situation in which it is necessary to acquire authentication information among the plurality of user authentication schemes in operation 1210, and may determine the user authentication scheme from among the plurality of candidate authentication schemes, based on the information on the use state in operation 1230. For example, in operation 1220, when a state of the electronic device 400 is the A unfolded state or the B folding state, all user authentication methods may be preferentially supported, so it may be a case in which operation 1220 is substantially omitted.

According to an embodiment of the disclosure, operation 1210 of FIG. 12 may correspond to operation 610 of FIG. 6, and operation 1220 of FIG. 12 may correspond to operation 620 of FIG. 6. Hereinafter, operation 1230 of FIG. 12 will be described.

Referring to FIG. 12, when the preferentially supported authentication scheme determined in operation 1220 is plural, in operation 1230, the processor 430 of an embodiment of the disclosure may determine a user authentication scheme from among the plurality of preferentially supported authentication schemes, based on information on a use state of the electronic device 400. For example, the information on the use state may be information on a state in which the electronic device 400 is used by a user, and may include information detected using the grip detection sensor 423, information detected using the rotation detection sensor 424, and/or identification information on an accessory connected to the electronic device 400. According to an embodiment of the disclosure, in operation 1220, the processor 430 may determine a preferentially supported authentication scheme according to a folding state of the electronic device 400 and then, in operation 1230, the processor 430 may determine once more, based on the information on the use state of the electronic device 400.

According to an embodiment of the disclosure, in operation 1230, the processor 430 may determine that the electronic device 400 is gripped by the user through the grip detection sensor 423 and in this case, the processor 430 may determine, as a user authentication scheme, an authentication scheme that is based on a contact between the electronic device 400 and a user's body from among the plurality of preferentially supported authentication schemes. For example, the authentication scheme being based on the contact between the electronic device 400 and the user's body may include fingerprint authentication, password authentication, PIN number authentication, and/or pattern authentication schemes.

According to an embodiment of the disclosure, in operation 1230, the processor 430 may determine a use orientation of the electronic device 400 through the rotation detection sensor 424, and in this case, the processor 430 may determine a user authentication scheme from among the plurality of preferentially supported authentication schemes, based on the determined use orientation. For example, the use orientation may include a landscape mode in which the electronic device is used horizontally by a user or a portrait mode in which the electronic device is used vertically by the user.

According to an embodiment of the disclosure, in operation 1230, the processor 430 may acquire identification information on an accessory connected to the electronic device 400 and recognize the accessory connected to the electronic device 400, and may determine, as a user authentication scheme, an authentication scheme that is based on the recognized accessory among the plurality of preferentially supported authentication schemes. For example, the accessory may include a keyboard or cradle that may be connected to the electronic device 400.

Figure 13:
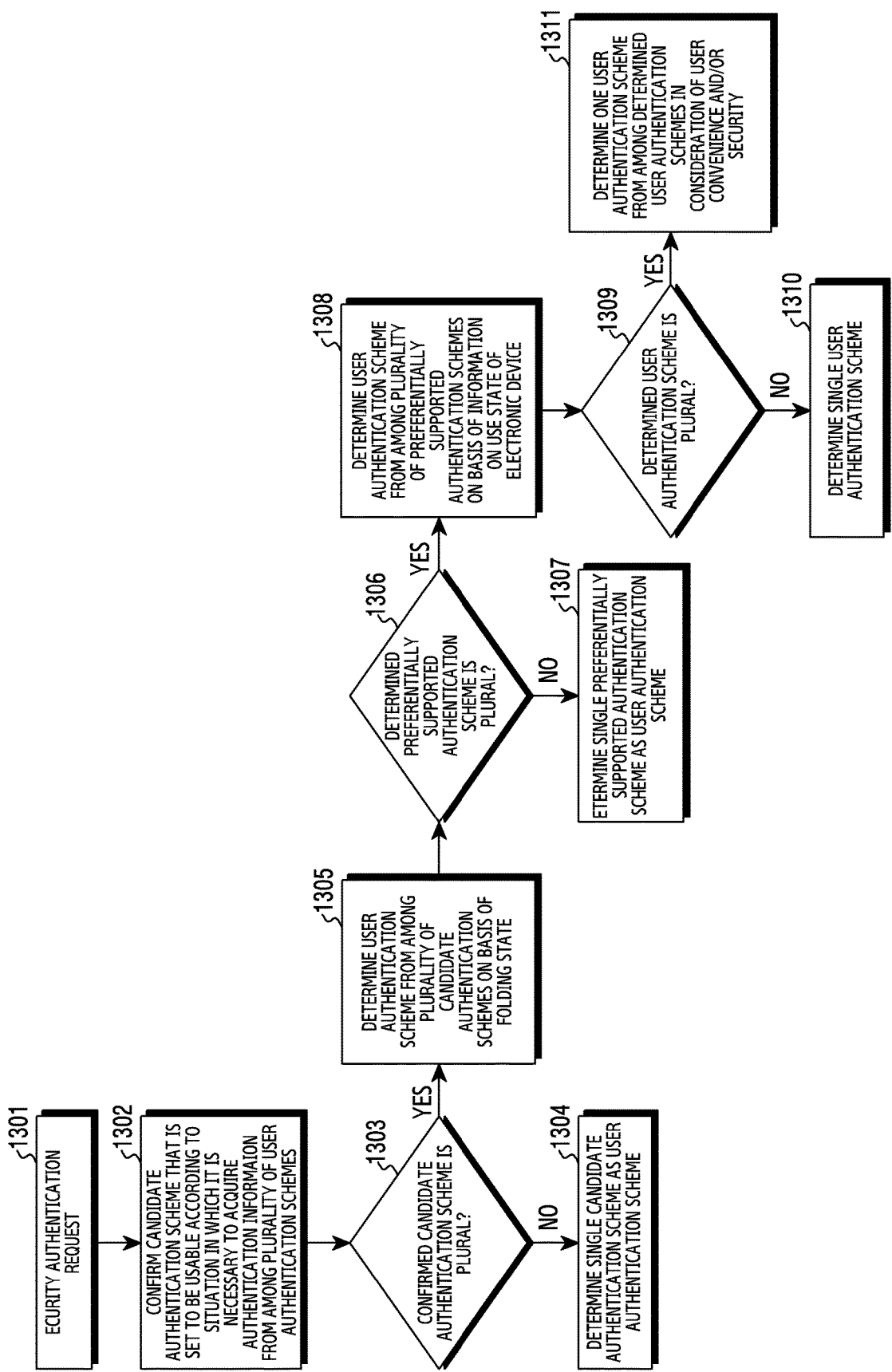
FIG. 13 is a flowchart illustrating a determination algorithm for determining a user authentication scheme of an electronic device according to an embodiment of the disclosure.

FIG. 13 is a flowchart illustrating a determination algorithm for determining a user authentication scheme of an electronic device according to an embodiment of the disclosure. The algorithm of FIG. 13 may explain the operations of FIG. 12.

Operation 1301 to operation 1304 of FIG. 13 may correspond to operation 701 to operation 704 of FIG. 7. Hereinafter, operations after operation 1304 will be explained with reference to FIG. 13.

Referring to FIG. 13, when a candidate authentication scheme confirmed in operation 1303 is plural (1303—Yes), in operation 1305, the processor 430 may determine a preferentially supported authentication scheme among the plurality of candidate authentication schemes, based on a folding state of the electronic device 400. In operation 1306, the processor 430 may determine whether the determined preferentially supported authentication scheme is plural, and when the determined preferentially supported authentication scheme is single (1306—No), in operation 1307, the processor 430 may finally determine the single preferentially supported authentication scheme as a user authentication scheme. When the preferentially supported authentication scheme determined in operation 1306 is plural (1306—Yes), in operation 1308, the processor 430 may determine a user authentication scheme from among the plurality of preferentially supported authentication schemes, based on information on a use state of the electronic device 400. In operation 1309, the processor 430 may determine whether the determined user authentication scheme is plural, and when the determined user authentication scheme is single (1309-NO), in operation 1310, the processor 430 may finally determine the single user authentication scheme. When the user authentication scheme determined in operation 1309 is plural (1309—Yes), in operation 1311, the processor 430 may determine one user authentication scheme from among the determined user authentication schemes based on user convenience and/or security. For example, in operation 1311, the processor 430 may finally determine a scheme having the highest security level among the plurality of user authentication schemes determined in operation 1308. For another example, in operation 1311, when a priority based on user convenience is set to the plurality of user authentication schemes determined in operation 1308, the processor 430 may finally determine a scheme having the highest priority.

According to an embodiment of the disclosure, operation 1302 of FIG. 13 may correspond to operation 1210 of FIG. 12, and operations 1303 and 1305 of FIG. 13 may correspond to operation 1220 of FIG. 12, and operations 1306 and 1308 of FIG. 13 may correspond to operation 1230 of FIG. 12.

Describing a standby screen unlock event as an example, when the processor 430 acquires a security authentication request from a standby screen, the processor 430 may determine (see Table 2), as preferentially supported authentication schemes, all face authentication, fingerprint authentication, password authentication, and pattern authentication schemes among candidate authentication schemes of face authentication, fingerprint authentication, password authentication, and pattern authentication set to be usable for unlocking, based on a unfolding state of the electronic device 400. Since the determined preferentially supported authentication scheme is plural, the processor 430 may determine whether the electronic device 400 is in a gripped state through the grip detection sensor 423, and when the electronic device 400 is in the gripped state, the processor 430 may determine the fingerprint authentication, password authentication, and pattern authentication schemes, as user authentication schemes. Since the determined user authentication scheme is plural, the processor 430 may finally determine the fingerprint authentication scheme as the user authentication scheme based on security. Or, when a priority based on user convenience is determined, the processor 430 may finally determine an authentication scheme having a high priority as the user authentication scheme. Or, the processor 430 may finally determine a user authentication scheme randomly among fingerprint authentication, password authentication, and pattern authentication schemes as well.

For another example, when the processor 430 acquires a security authentication request from the standby screen, the electronic device 400 may determine (see Table 2), as the preferentially supported authentication schemes, all face authentication, fingerprint authentication, password authentication, and pattern authentication schemes among candidate authentication schemes of face authentication, fingerprint authentication, password authentication, and pattern authentication set to be usable for unlocking, based on the A unfolded state of the electronic device 400. Since the determined preferentially supported authentication scheme is plural, the processor 430 may determine a direction in which the electronic device 400 is gripped and used through the grip detection sensor 423 and the rotation detection sensor 424. When the electronic device 400 is gripped in a portrait mode, the processor 430 may determine the face authentication as the user authentication scheme based on user convenience and security, and when the electronic device 400 is gripped in the landscape mode, the processor 430 may determine the fingerprint authentication as the user authentication scheme based on user convenience and security.

For further example, when the processor 430 acquires a security authentication request from the standby screen, the processor 430 may determine (see Table 2), as preferentially supported authentication schemes, all face authentication, fingerprint authentication, password authentication, and pattern authentication schemes among candidate authentication schemes of face authentication, fingerprint authentication, password authentication, and pattern authentication set to be usable for unlocking, based on the A unfolded state of the electronic device 400. Since the determined preferentially supported authentication scheme is plural, the processor 430 may acquire identification information on an accessory connected to the electronic device 400 and recognize that a keyboard is connected to the electronic device 400, and may determine the password authentication as the user authentication scheme based on user convenience and security. Or, when recognizing that a cradle is connected to the electronic device 400, the processor 430 may determine the face authentication as the user authentication scheme based on user convenience and security.

Figure 14:
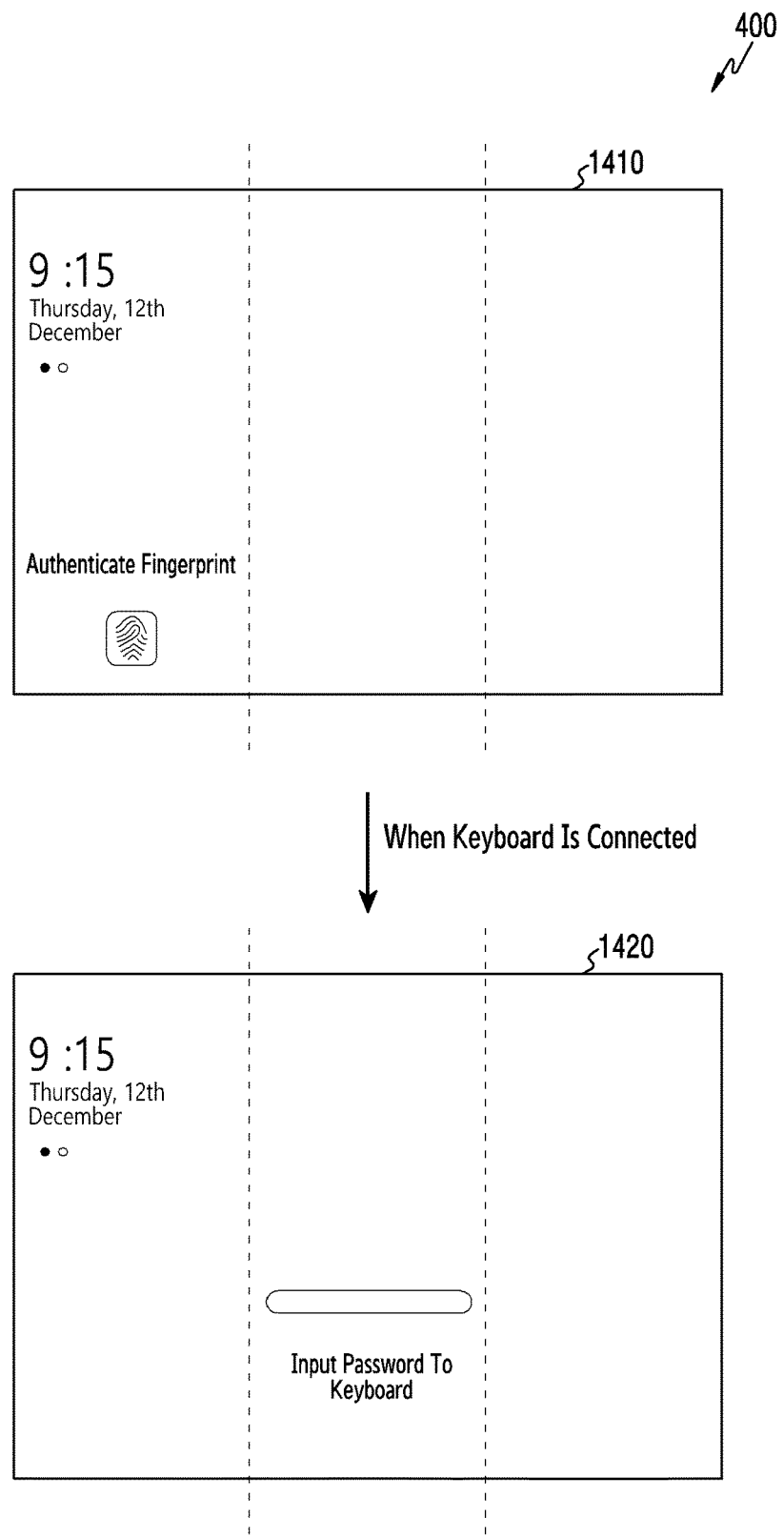
FIG. 14 is a diagram illustrating a method for acquiring authentication information when a keyboard is connected to an electronic device according to an embodiment of the disclosure.

FIG. 14 is a diagram illustrating a method for acquiring authentication information when a keyboard is connected to an electronic device according to an embodiment of the disclosure.

Referring to FIG. 14, reference numeral 1410 is an example of displaying, on the display 440, an authentication information acquisition message corresponding to operation 1220 of FIG. 12, that is, to the user authentication scheme determined in FIG. 7, and reference numeral 1420 is an example of displaying, on the display 440, an authentication information acquisition message corresponding to operation 1230 of FIG. 12, that is, to the authentication scheme determined in FIG. 13. For example, when the user authentication scheme is determined once more based on information on a use state of the electronic device 400, the determined user authentication scheme may be varied. For example, even though a security level of fingerprint authentication among a plurality of preferentially supported authentication schemes that the processor 430 has determined based on a folding state of the electronic device 400 is high, the processor 430 may determine a password authentication scheme as a final user authentication scheme, when the processor 430 recognizes that an accessory is connected to the electronic device 400.

Figure 15:
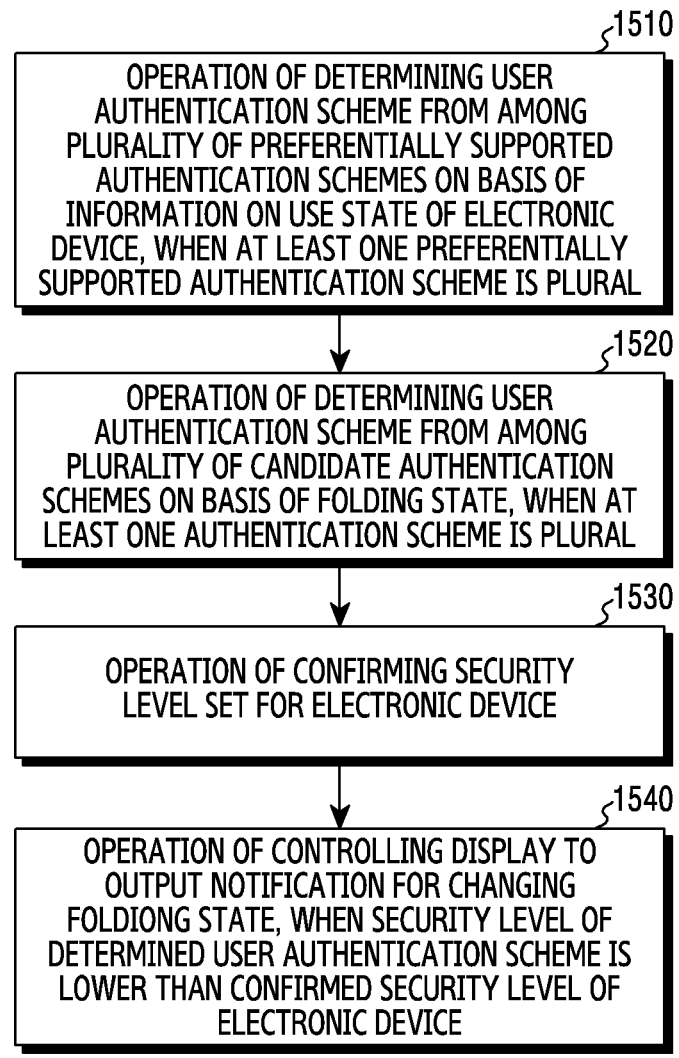
FIG. 15 is a flowchart illustrating a method for determining a user authentication scheme of an electronic device according to an embodiment of the disclosure.

FIG. 15 is a flowchart illustrating a method for determining a user authentication scheme of an electronic device according to an embodiment of the disclosure.

Referring to FIG. 15, operation 510 of FIG. 5 may include operation 1510 of confirming at least one candidate authentication scheme set to be usable according to a situation in which it is necessary to require acquisition of authentication information among a plurality of user authentication schemes, operation 1520 of, when the at least one candidate authentication scheme is plural, determining a user authentication scheme among the plurality of candidate authentication schemes, based on a folding state, operation 1530 of confirming a security level set for the electronic device 400, and operation 1540 of, when a security level of the user authentication scheme is lower than the confirmed security level of the electronic device 400, controlling the display 440 to output a notification for changing the folding state.

According to an embodiment of the disclosure, operation 1510 of FIG. 15 may correspond to operation 610 of FIG. 6, and operation 1520 of FIG. 15 may correspond to operation 620 of FIG. 6. Hereinafter, operations 1530 and 1540 of FIG. 12 will be described.

Referring to FIG. 15, in operation 1530, the processor 430 of an embodiment of the disclosure may confirm the security level set for the electronic device 400, and in operation 1540, may compare a security level of the determined user authentication scheme and the confirmed security level of the electronic device 400 and, when the security level of the determined user authentication scheme is lower, the processor 430 may control the display 440 to output a notification for changing the folding state of the electronic device 400. Through the above operation, the processor 430 may guide a user to change the folding state when the security level of the user authentication scheme that is determined based on the folding state of the electronic device 400 is low.

Figure 16:
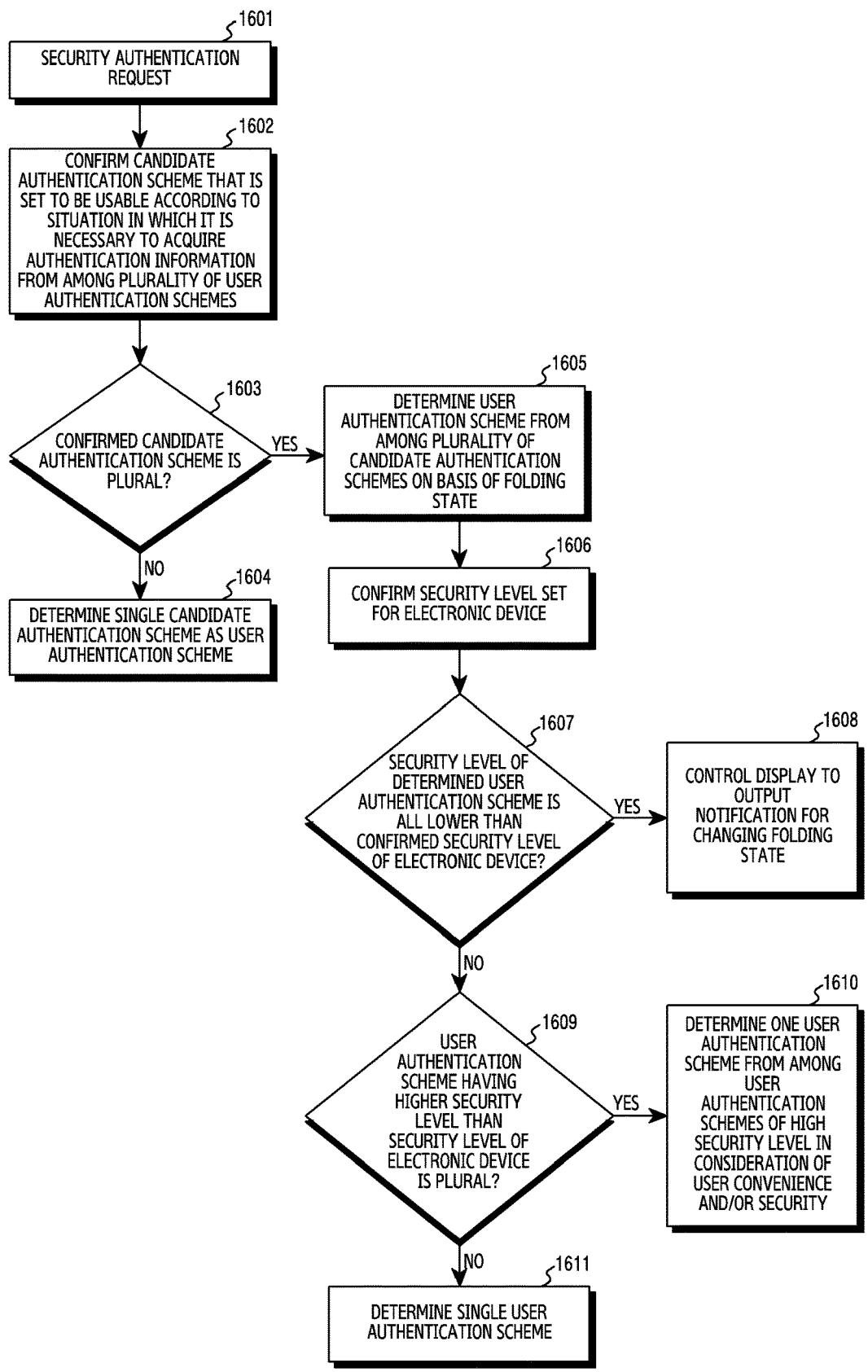
FIG. 16 is a flowchart illustrating a determination algorithm for determining a user authentication scheme of an electronic device according to an embodiment of the disclosure.

FIG. 16 is a flowchart illustrating a determination algorithm for determining a user authentication scheme of an electronic device according to an embodiment of the disclosure. The algorithm of FIG. 16 may explain the operations of FIG. 15.

Operations 1601 to 1605 of FIG. 16 may correspond to operations 701 to 705 of FIG. 7. Hereinafter, operations after operation 1605 will be explained with reference to FIG. 16.

Referring to FIG. 16, in operation 1606, the processor 430 may confirm a security level set for the electronic device 400, and in operation 1607, may determine whether a security level of a determined user authentication scheme is all lower than the confirmed security level of the electronic device 400. When none of the security level of the determined user authentication scheme is higher than the confirmed security level of the electronic device (1607—Yes), in operation 1608, the processor 430 may control the display 440 to output a notification for changing the folding state of the electronic device 400. When any of the security level of the determined user authentication scheme is higher than the confirmed security level of the electronic device (1607—No), in operation 1609, the processor 430 may determine whether the user authentication scheme having the higher security level than the security level of the electronic device 400 is plural. When the user authentication scheme having the higher security level than the security level of the electronic device 400 is single (1609—No), in operation 1611, the processor 430 may finally determine the single user authentication scheme of the high security level, and when the user authentication scheme having the higher security level than the security level of the electronic device 400 is plural (1609—Yes), in operation 1610, the processor 430 may determine one user authentication scheme among the determined user authentication schemes of the high security level based on user convenience and/or security.

According to an embodiment of the disclosure, operation 1602 of FIG. 16 may correspond to operation 1510 of FIG. 15, and operations 1603 and 1605 of FIG. 16 may correspond to operation 1520 of FIG. 15, and operation 1606 of FIG. 16 may correspond to operation 1530 of FIG. 15, and operations 1607 and 1608 of FIG. 16 may correspond to operation 1540 of FIG. 15.

Figure 17:
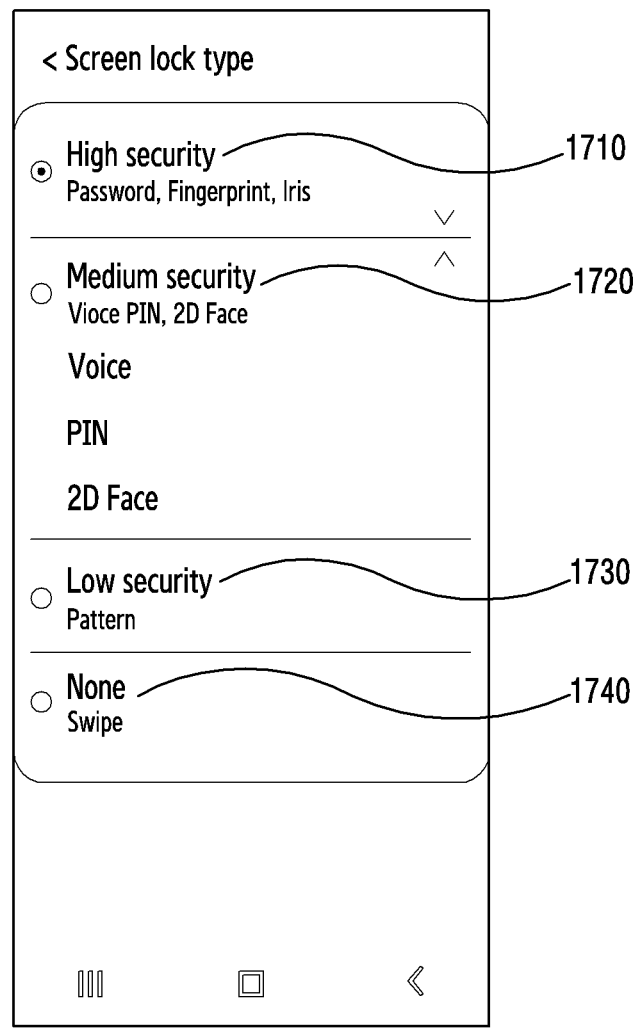
FIG. 17 is a diagram illustrating a method for setting a security level of an electronic device according to an embodiment of the disclosure.

FIG. 17 is a diagram illustrating a method for setting a security level of an electronic device according to an embodiment of the disclosure.

Referring to FIG. 17, a user may set a security level of the electronic device 400. According to an embodiment of the disclosure, the security level may include a plurality of levels, and may include the levels of high security 1710, medium security 1720, low security 1730, and security none 1740. The type of authentication scheme included for each security level is described using Table 3 below.

TABLE 3

| Authentication scheme | Security level | | |
|---|---|---|---|
| iris authentication, fingerprint authentication password authentication face authentication voice authentication PIN number authentication pattern authentication | high security | medium security | low security |

Referring to Table 3, when a high security level is set for the electronic device 400, user authentication schemes of iris authentication, fingerprint authentication, and password authentication may be included. When a medium security level is set, not only the user authentication schemes belonging to the high security level but also user authentication schemes of face authentication, voice authentication, and PIN number authentication may be included. When a low security level is set, not only the user authentication schemes belonging to the medium level but also a pattern authentication scheme may be included.

Figure 18:
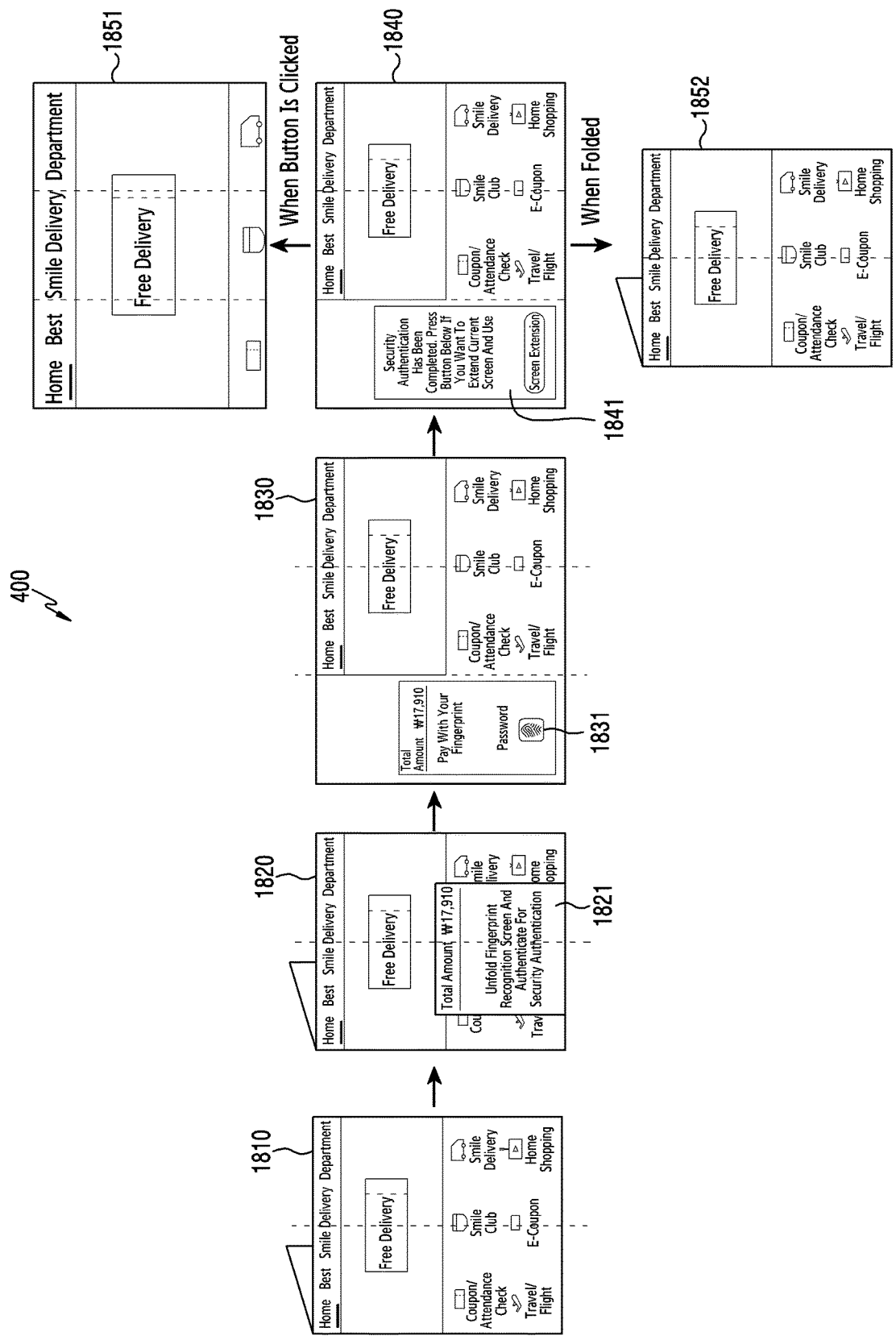
FIG. 18 is a diagram illustrating a method for changing a folding state of an electronic device according to an embodiment of the disclosure.

FIG. 18 is a diagram illustrating a method for changing a folding state of an electronic device according to an embodiment of the disclosure.

Referring to FIG. 18, when a security level of a determined user authentication scheme is all lower than a security level set for the electronic device 400, that is, when none of the security level of the determined user authentication scheme is higher than the security level set for the electronic device 400, the processor 430 may control the display 440 to display a notification for changing a folding state of the electronic device 400.

Referring to FIG. 18, reference numeral 1810 is an example of using in a landscape mode when the folding state of the electronic device 400 is the H folding state. However, the disclosure is not limited thereto, and using in a portrait mode in the H folding state is also applicable. When an event requiring security authentication occurs while an application is running in the electronic device 400 in the H folding state, and a determined user authentication scheme is a fingerprint authentication scheme, in operation 1820, the processor 430 may display a message 1821 of unfolding a folded housing (e.g., the first housing 411) including the fingerprint input device 452. Reference numeral 1830 is an example in which the folded first housing 411 is unfolded by a user. According to an embodiment of the disclosure, when the folded first housing 411 is unfolded, the processor 430 may activate the first display region 441 and display a message 1831 of requesting fingerprint authentication on the first display region 441. When the fingerprint authentication is completed, in 1840, the processor 430 may display a message 1841 of asking whether to extend and use the outputted display region, and may induce user's selection. As in 1851, in response to a user input (e.g., a touch of an approval button) for the message 1841, the processor 430 may extend a currently used application screen up to the first display region 441 and display. As in 1852, when the first housing 411 is folded, the processor 430 may turn off the first display region 441 again and return to the first state 1810.

According to an embodiment of the disclosure, when the security level of the determined user authentication scheme is all lower than the security level set for the electronic device 400, there is a method of turning over the electronic device 400 to guide an authentication information acquisition region to be arranged toward a user, in addition to a method of guiding the change of the folding state of the electronic device 400.

Figure 19:
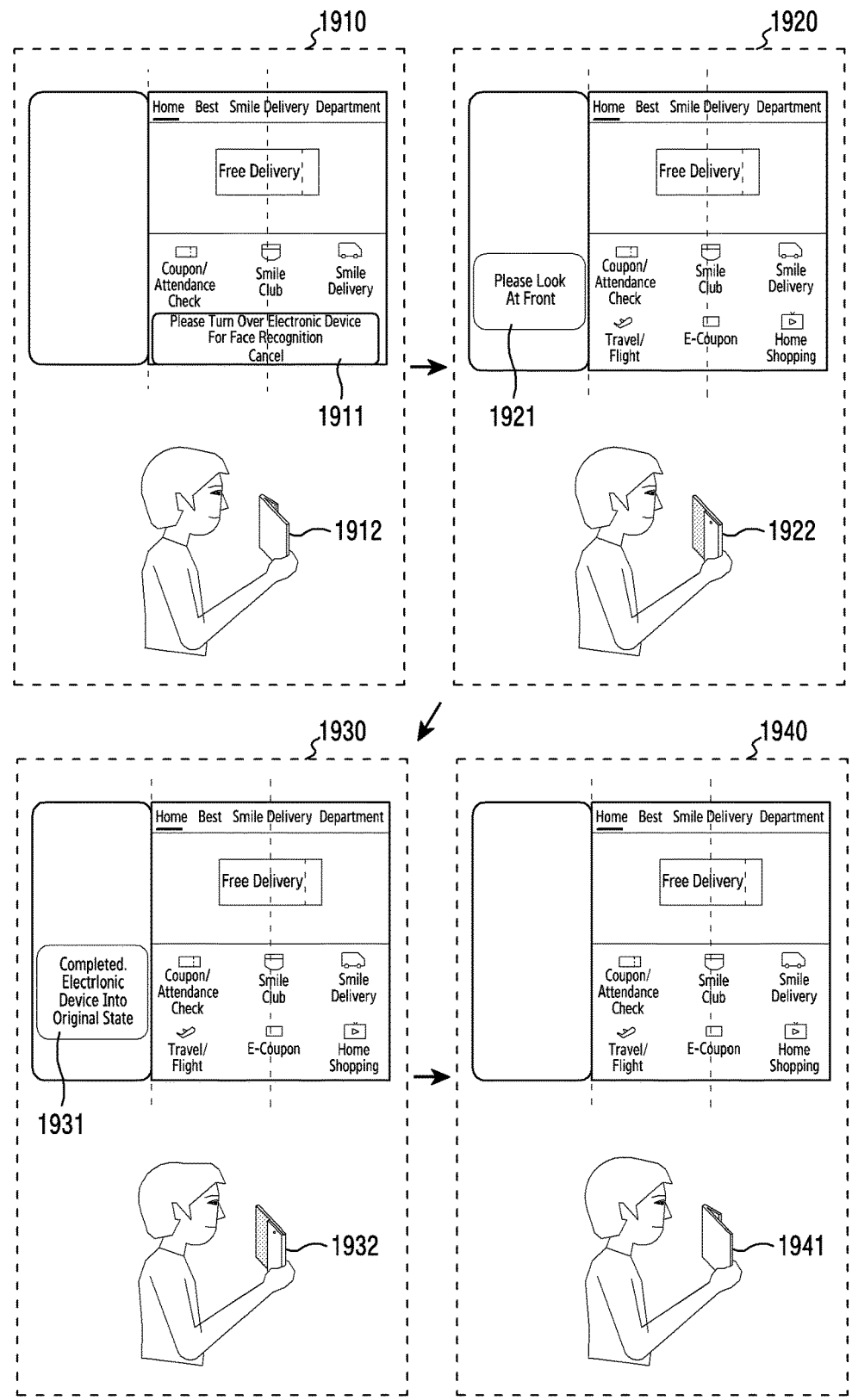
FIG. 19 is a diagram illustrating a method for turning over an electronic device in order to acquire authentication information according to an embodiment of the disclosure.

FIG. 19 is a diagram illustrating a method for turning over an electronic device in order to acquire authentication information according to an embodiment of the disclosure.

Referring to FIG. 19, in state 1910, when an event requiring security authentication occurs while the electronic device 400 is used (1912) in the H-folding state, and a determined user authentication scheme is a face authentication scheme, the processor 430 may display a message 1911 of requesting a user to turn over the electronic device 400. When the user turns over the electronic device and arranges wherein the first display region 441 of an off state faces a user (1922), in state 1920, the processor 430 may activate the first display region 441 and may display a message 1921 of requesting face authentication on the first display region 441. When the face authentication is completed, in state 1930, the processor 430 may display a message 1931 of requesting to turn the turned-over electronic device 1932 back to its original state. When the user turns the electronic device 400 back to its original state (1941), in state 1940, the processor 430 may turn off the first display region 441 again and return to the initial state 1910. According to an embodiment of the disclosure, while the face authentication is in progress in state 1920 and state 1930, the second display region 442 and the third display region 443 may be in an activation state similar to state 1910, or may be in a state in which a touch input is prohibited, or may be in an inactivation state in which power consumption is minimized.

According to an embodiment of the disclosure, the activation state may be a state in which power of the display 440 turns on and all functions supported by the display 440 are available, and the inactivation state, a state of a low power mode, may be a state of minimizing a function and blacking a screen in order to minimize power consumption.

As described above, a method for determining a user authentication scheme of an electronic device (e.g., the electronic device 101, the electronic device 400 of FIG. 4) may include determining a user authentication scheme from among a plurality of user authentication schemes, based on a folding state of the electronic device according to a first folding state with respect to a first housing of the electronic device and a second housing of the electronic device and a second folding state with respect to the second housing and a third housing of the electronic device (e.g., operation 510 of FIG. 5), and controlling an input device corresponding to the determined user authentication scheme among at least one input device for acquiring authentication information for performing user authentication that is based on a plurality of user authentication schemes of the electronic device, to acquire the authentication information (e.g., operation 520 of FIG. 5).

According to an embodiment of the disclosure, determining the user authentication scheme (e.g., operation 510 of FIG. 5) may include confirming at least one candidate authentication scheme that is set to be usable according to a situation in which it is necessary to acquire authentication information among the plurality of user authentication schemes (e.g., operation 610 of FIG. 6), and, when the at least one candidate authentication scheme is plural, determining the user authentication scheme from among the plurality of candidate authentication schemes, based on the folding state (e.g., operation 620 of FIG. 6).

According to an embodiment of the disclosure, determining the user authentication scheme (e.g., operation 510 of FIG. 5) may further include confirming a security level set for the electronic device (e.g., operation 1530 of FIG. 15), and when a security level of the determined user authentication scheme is lower than the confirmed security level of the electronic device, controlling a display of the electronic device to output a notification for changing the folding state (e.g., operation 1540 of FIG. 15).

According to an embodiment of the disclosure, confirming the at least one candidate authentication scheme (e.g., operation 610 of FIG. 5) may include, when an event for acquiring the authentication information occurs, confirming the at least one candidate authentication scheme from among the plurality of user authentication schemes according to the event.

According to an embodiment of the disclosure, determining the user authentication scheme (e.g., operation 510 of FIG. 5) may include confirming at least one candidate authentication scheme set to be usable according to a situation in which it is necessary to acquire authentication information among the plurality of user authentication schemes (e.g., operation 1210 of FIG. 12), and when the at least one candidate authentication scheme is plural, determining at least one preferentially supported authentication scheme from among the plurality of candidate authentication schemes, based on the folding state (e.g., operation 1220 of FIG. 12), and when the at least one preferentially supported authentication scheme is plural, determining the user authentication scheme from among the plurality of preferentially supported authentication schemes, based on information on a use state of the electronic device (e.g., operation 1230 of FIG. 12).

According to an embodiment of the disclosure, the information on the use state may include information detected using a grip detection sensor of the electronic device, and determining the user authentication scheme from among the plurality of preferentially supported authentication schemes (e.g., operation 1230 of FIG. 12) may include, when it is determined that the electronic device is in a state of being gripped by a user through the grip detection sensor, determining, as the user authentication scheme, an authentication scheme that is based on a user's physical contact with the electronic device from among the plurality of preferentially supported authentication schemes.

According to an embodiment of the disclosure, the information on the use state may include information detected using a rotation detection sensor, and determining the user authentication scheme from among the plurality of preferentially supported authentication schemes (e.g., operation 1230 of FIG. 12) may include determining a use orientation of the electronic device through the rotation detection sensor, and determining the user authentication scheme from among the plurality of preferentially supported authentication schemes, based on the determined use orientation.

According to an embodiment of the disclosure, the information on the use state may include identification information on an accessory connected to the electronic device, and determining the user authentication scheme from among the plurality of preferentially supported authentication schemes (e.g., operation 1230 of FIG. 12) may include acquiring the identification information and recognizing the accessory connected to the electronic device, and determining, as the user authentication scheme, an authentication scheme that is based on the recognized accessory from among the plurality of preferentially supported authentication schemes.

According to an embodiment of the disclosure, determining the user authentication scheme from among the plurality of candidate authentication schemes (e.g., operation 620 of FIG. 6) may include determining the user authentication scheme from among the plurality of candidate authentication schemes, based on the folding state and an activation state of the display according to the folding state.

According to an embodiment of the disclosure, at least one of the at least one input device may be accommodated in the first housing and, in determining the user authentication scheme, the activation state of the display may include an activation state of a display region accommodated in the first housing among the display.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a first housing;
a second housing foldable around a first folding axis with respect to the first housing;
a third housing foldable around a second folding axis with respect to the second housing;
a first sensor configured to detect a first folding state with respect to the first housing and the second housing;
a second sensor configured to detect a second folding state with respect to the second housing and the third housing;
at least one input device configured to acquire authentication information for performing user authentication that is based on a plurality of user authentication schemes;
at least one processor; and
memory storing instructions that, when executed by the at least one processor, cause the electronic device to:
determine whether an authentication information acquisition region capable of sensing biometric information for the user authentication is active, according to the first folding state and the second folding state,
determine a user authentication scheme from among the plurality of user authentication schemes, based on a result of the determination of whether the authentication information acquisition region is active, and
control an input device corresponding to the determined user authentication scheme among the at least one input device to acquire the authentication information.

2. The electronic device of claim 1, wherein the instructions, when executed by the at least one processor, further cause the electronic device to:
confirm at least one candidate authentication scheme that is set to be usable according to a situation in which it is necessary to acquire authentication information among the plurality of user authentication schemes, and
when the at least one candidate authentication scheme is plural, determine the user authentication scheme from among a plurality of candidate authentication schemes, based on the folding state.

3. The electronic device of claim 2, further comprising:
a display at least partially accommodated in the first housing, the second housing, and the third housing,
wherein the instructions, when executed by the at least one processor, further cause the electronic device to:
confirm a security level set for the electronic device, when determining the user authentication scheme, and
control the display to output a notification for changing the folding state when a security level of the determined user authentication scheme is lower than the confirmed security level of the electronic device.

4. The electronic device of claim 3, wherein the instructions, when executed by the at least one processor, cause the electronic device to: when determining the user authentication scheme, determine the user authentication scheme from among the plurality of candidate authentication schemes, based on the folding state and an activation state of the display according to the folding state.

5. The electronic device of claim 4,
wherein at least one of the at least one input device is accommodated in the first housing, and
wherein the activation state of the display comprises an activation state of a display region accommodated in the first housing among the display.

6. The electronic device of claim 2, wherein; the instructions, when executed by the at least one processor, cause the electronic device to: when an event for acquiring the authentication information occurs, confirm the at least one candidate authentication scheme from among the plurality of user authentication schemes according to the event.

7. The electronic device of claim 1, wherein the instructions, when executed by the at least one processor, further cause the electronic device to:
confirm at least one candidate authentication scheme that is set to be usable according to a situation in which it is necessary to acquire authentication information among the plurality of user authentication schemes,
when the at least one candidate authentication scheme is plural, determine at least one preferentially supported authentication scheme from among a plurality of candidate authentication schemes, based on the folding state, and
when the at least one preferentially supported authentication scheme is plural, determine the user authentication scheme from among a plurality of preferentially supported authentication schemes, based on information on a use state of the electronic device.

8. The electronic device of claim 7, further comprising:
a third sensor configured to detect a state in which the electronic device is gripped by a user,
wherein the information on the use state comprises information detected using the third sensor, and
wherein the instructions, when executed by the at least one processor, cause the electronic device to: when it is determined, through the third sensor, that the electronic device is in a state of being gripped by the user, determine, as the user authentication scheme, an authentication scheme that is based on a user's physical contact with the electronic device from among the plurality of preferentially supported authentication schemes.

9. The electronic device of claim 7, further comprising:
a fourth sensor configured to detect whether the electronic device is rotated,
wherein the information on the use state comprises information detected using the fourth sensor, and
wherein the instructions, when executed by the at least one processor, further cause the electronic device to:
determine a use orientation of the electronic device through the fourth sensor, and
determine the user authentication scheme from among the plurality of preferentially supported authentication schemes, based on the determined use orientation.

10. The electronic device of claim 7,
wherein the information on the use state comprises identification information on an accessory connected to the electronic device, and
wherein the instructions, when executed by the at least one processor, further cause the electronic device to:
acquire the identification information and recognizes the accessory connected to the electronic device, and
determine, as the user authentication scheme, an authentication scheme that is based on the recognized accessory from among the plurality of preferentially supported authentication schemes.

11. The electronic device of claim 1,
wherein the processor is further configured to determine, based on determining that there is a restriction on interaction between the user and the electronic device, the user authentication scheme as at least one of: face authentication, iris authentication, or voice authentication.

12. The electronic device of claim 1, wherein the processor is further configured to determine, based on determining that there is not a restriction on interaction between the user and the electronic device, the user authentication scheme as at least one of: face authentication, iris authentication, fingerprint authentication, voice authentication, password authentication, PIN number authentication, or a pattern authentication scheme.

13. The electronic device of claim 1, wherein the processor is further configured to determine the authentication scheme based on an accessory connected to the electronic device.

14. A method for determining a user authentication scheme of an electronic device, the method comprising:
- determining whether an authentication information acquisition region capable of sensing biometric information for the user authentication is active, according to a first folding state and a second folding state;
- determining a user authentication scheme from among a plurality of user authentication schemes, based on a result of the determination of whether the authentication information acquisition region is active; and
- controlling an input device corresponding to the determined user authentication scheme among at least one input device for acquiring authentication information for performing user authentication that is based on a plurality of user authentication schemes of the electronic device, to acquire the authentication information.

15. The method of claim 14, wherein the determining of the user authentication scheme comprises:
- confirming at least one candidate authentication scheme that is set to be usable according to a situation in which it is necessary to acquire authentication information among the plurality of user authentication schemes; and
- when the at least one candidate authentication scheme is plural, determining the user authentication scheme from among a plurality of candidate authentication schemes, based on the folding state.

16. The method of claim 15, wherein the determining of the user authentication scheme further comprises:
- confirming a security level set for the electronic device; and
- when a security level of the determined user authentication scheme is lower than the confirmed security level of the electronic device, controlling a display of the electronic device to output a notification for changing the folding state.

17. The method of claim 15, wherein the confirming of the at least one candidate authentication scheme comprises:
- when an event for acquiring the authentication information occurs, confirming the at least one candidate authentication scheme from among the plurality of user authentication schemes according to the event.

18. The method of claim 14, wherein the determining of the user authentication scheme comprises:
- confirming at least one candidate authentication scheme set to be usable according to a situation in which it is necessary to acquire authentication information among the plurality of user authentication schemes;
- when the at least one candidate authentication scheme is plural, determining at least one preferentially supported authentication scheme from among the plurality of candidate authentication schemes, based on the folding state; and
- when the at least one preferentially supported authentication scheme is plural, determining the user authentication scheme from among the plurality of preferentially supported authentication schemes, based on information on a use state of the electronic device.

* * * * *